(12) United States Patent
D'Agostino et al.

(10) Patent No.: US 12,547,772 B2
(45) Date of Patent: Feb. 10, 2026

(54) LOCATION-BASED NOTIFICATION METHOD AND SYSTEM

(71) Applicant: The Toronto-Dominion Bank, Toronto (CA)

(72) Inventors: Dino Paul D'Agostino, Richmond Hill (CA); Michel Proulx, Toronto (CA); Laura Victoria Wyatt, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 141 days.

(21) Appl. No.: 18/617,916

(22) Filed: Mar. 27, 2024

(65) Prior Publication Data

US 2025/0307461 A1 Oct. 2, 2025

(51) Int. Cl.
*G06F 21/62* (2013.01)

(52) U.S. Cl.
CPC .................. *G06F 21/6254* (2013.01)

(58) Field of Classification Search
CPC .................................................. G06F 21/6254
See application file for complete search history.

(56) References Cited

U.S. PATENT DOCUMENTS

| | | |
|---|---|---|
| 9,311,632 B1 | 4/2016 | Dent |
| 9,420,423 B1 | 8/2016 | Mendelson |
| 9,514,463 B2 | 12/2016 | Grigg et al. |
| 9,699,599 B2 | 7/2017 | Cardinal et al. |
| 9,984,520 B1 | 5/2018 | Heller et al. |
| 10,089,857 B2 | 10/2018 | Atchley et al. |
| 10,453,087 B2 | 10/2019 | Benjamin et al. |
| 10,846,958 B2 | 11/2020 | Raduchel |
| 11,049,074 B1 | 6/2021 | Eby et al. |
| 11,095,473 B2 | 8/2021 | Xing |

(Continued)

FOREIGN PATENT DOCUMENTS

| | | |
|---|---|---|
| WO | 2021176107 A1 | 9/2021 |
| WO | 2022103373 A3 | 5/2022 |
| WO | 2022217306 A1 | 10/2022 |

OTHER PUBLICATIONS

PNC Bank; Welcome to the Lobby—A convenient way for you to check in to PNC Branches; https://www.pnc.com/en/personal-banking/banking/services/branch-visit.html; date accessed Jan. 26, 2024.

*Primary Examiner* — Stephen T Gundry
(74) *Attorney, Agent, or Firm* — Rowand LLP; Peter Eschlboeck

(57) ABSTRACT

Methods and computer systems for notifications. Generating anonymous information and associating the anonymous information with a particular profile in a plurality of profiles. During an authenticated state of a software application installed on a computing device, provisioning the software application with the anonymous information. During an unauthenticated state of the software application, receiving, from the software application, the anonymous information and an indication of detection of the computing device at a premises. In response to receiving the anonymous information and the indication of detection, selecting the particular profile based on the anonymous information and transmitting a notification based on the selected particular profile. The notification may be generated using artificial intelligence based on stored data corresponding to the particular profile.

20 Claims, 12 Drawing Sheets

(56) References Cited

U.S. PATENT DOCUMENTS

| | | |
|---|---|---|
| 11,157,929 B1 | 10/2021 | Eby et al. |
| 11,468,506 B1 | 10/2022 | Osterkamp et al. |
| 12,411,676 B1 * | 9/2025 | Lanner .................... G06F 8/65 |
| 2006/0253358 A1 | 11/2006 | Degrosso et al. |
| 2007/0027806 A1 | 2/2007 | Sands et al. |
| 2008/0061957 A1 | 3/2008 | Nguyen et al. |
| 2010/0235218 A1 | 9/2010 | Erhart et al. |
| 2016/0092944 A1 | 3/2016 | Taylor et al. |
| 2020/0252399 A1 * | 8/2020 | Hancock ............. H04L 63/0823 |
| 2022/0248188 A1 | 8/2022 | Jones |
| 2022/0343704 A1 | 10/2022 | Hill et al. |
| 2023/0325261 A1 * | 10/2023 | Schnurr ............. H04M 3/5175 |
| | | 719/318 |
| 2025/0140101 A1 * | 5/2025 | Fucci .................. G08B 27/001 |
| 2025/0181420 A1 * | 6/2025 | Talavera ................ G06F 9/5083 |
| 2025/0182163 A1 * | 6/2025 | Publicover ............ H04L 67/306 |
| 2025/0182481 A1 * | 6/2025 | Amini ...................... G06N 3/09 |
| 2025/0232340 A1 * | 7/2025 | Nasreddine ............. H04L 63/08 |
| 2025/0245310 A1 * | 7/2025 | Fong ........................ G06F 21/44 |
| 2025/0260578 A1 * | 8/2025 | Sree Krishna ........ H04L 9/3226 |
| 2025/0278726 A1 * | 9/2025 | Bhat .................... G06Q 20/401 |

* cited by examiner

LOCATION-BASED NOTIFICATION METHOD AND SYSTEM

FIELD

The present disclosure relates to notifications and, more particularly, to systems and methods for location-based notifications.

BACKGROUND

Notifications are often triggered when a device is detected in a location. In some scenarios, the notifications require access to protected data. Users of the device may need to authenticate with a software application to grant the software application permission to access protected data for inclusion in the notifications. For example, a user may provide to a software application their login credentials (i.e. username and password) for accessing their account. Upon successful authentication, the access control system allows access to the user's account to generate the notifications. These systems may be complex and require significant amounts of computing resources.

It would be advantageous to provide for more efficient and lightweight systems and methods for providing location-based notifications.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

Figure 1:
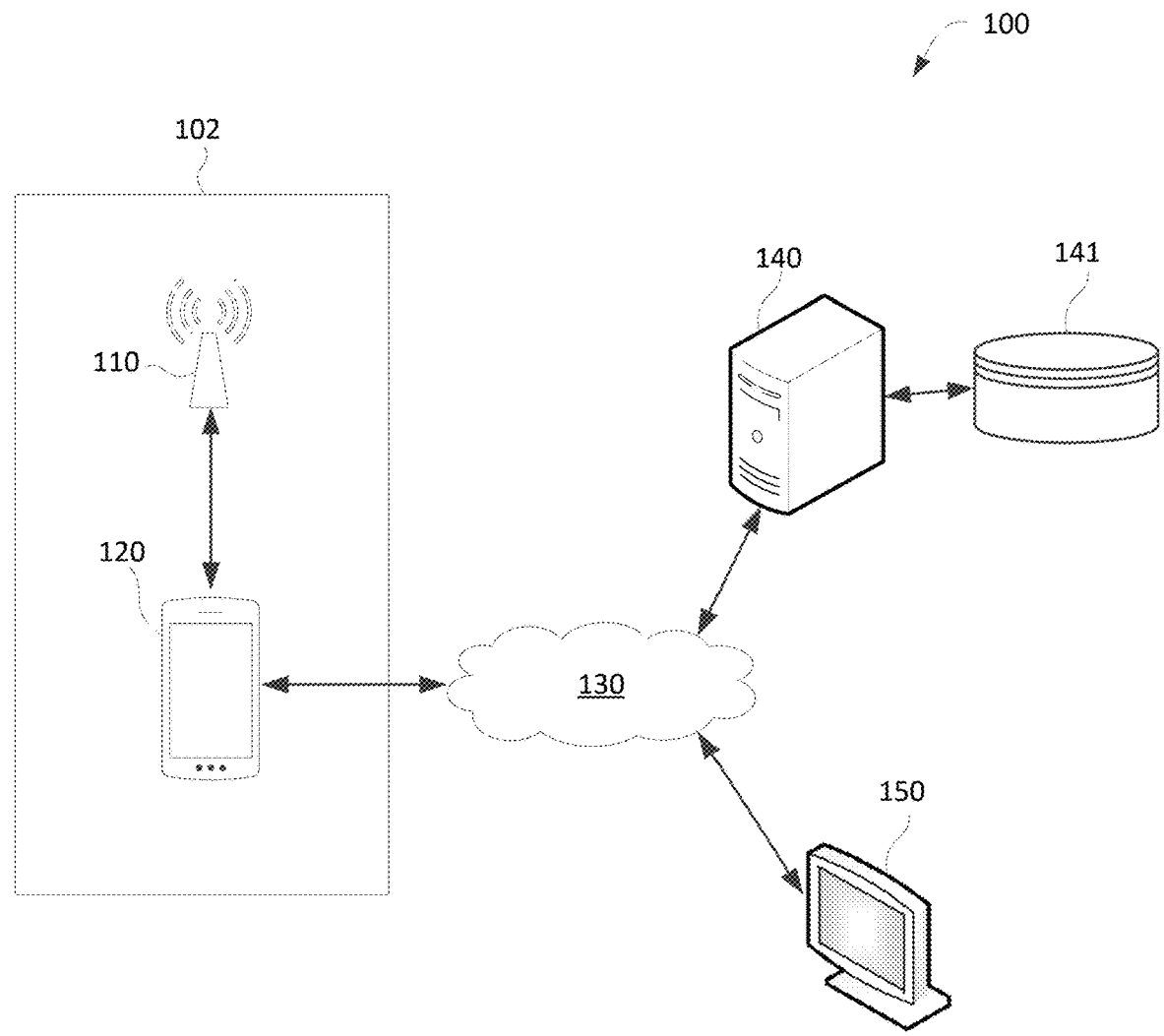
FIG. 1 shows a schematic diagram illustrating an operating environment of an example embodiment according to the subject matter of the present application.

In one aspect, the present application describes a system. The system may include a communications module; one or more processors coupled to the communications module; and a memory coupled to the one or more processors. The memory may store instructions that, when executed by the system, cause the system to generate anonymous information and associate the anonymous information with a particular profile in a plurality of profiles; during an authenticated state of a software application installed on a computing device, provision the software application with the anonymous information; and during an unauthenticated state of the software application: receive, from the software application, the anonymous information and an indication of detection of the computing device at a premises; and in response to receiving the anonymous information and the indication of detection: select the particular profile based on the anonymous information; and transmit a notification based on the selected particular profile.

In some implementations, the instructions, when executed by the system, may cause the system to, during the unauthenticated state of the software application, receive, from the software application, a location identifier corresponding to the premises, wherein the selection of the particular profile is further based on the location identifier.

In some implementations, the location identifier may include a transit number representing a branch of a financial institution.

In some implementations, the computer system may further include a beacon located at the premises and configured to emit a signal for reception by the computing device and to trigger the software application to automatically send the indication and the anonymous information to the computer system. The signal may include the location identifier.

In some implementations, the instructions, when executed by the system, may cause the system to generate the notification based on stored data corresponding to the particular profile.

In some implementations, the notification may be transmitted to the software application and the notification may prompt for input for transitioning the software application from the unauthenticated state to a second authenticated state.

In some implementations, the instructions, when executed by the system, may cause the system to, during the second authenticated state of the software application, transmit to the software application a message that has a higher sensitivity level than the notification.

In some implementations, the notification may include an option to navigate within the premises to a particular location.

In some implementations, the instructions, when executed by the system, may cause the system to trigger the transmission of the notification in response to a determination that the particular profile corresponds to a particular category.

In some implementations, the particular category may be a customer attrition category and the notification may be transmitted to a customer service representative device located at the premises.

In some implementations, the instructions, when executed by the system, may cause the system to categorize the particular profile as being associated with the particular category by an application of a generative artificial intelligence algorithm to at least a portion of a communication to generate an indication of sentiment.

In another aspect, the memory may store instructions that, when executed by the system, cause the system to determine that a computing device is at a premises; determine that a profile associated with the computing device corresponds to a scheduled appointment at the premises with an entity; in response to a determination that the profile is associated with the scheduled appointment, cause the computing device to provide a selectable option to send an indication signal; and receive an indication of actuation of the selectable option and, in response, send a notification to a terminal associated with the entity indicating that the computing device is at the premises.

In some implementations, the instructions, when executed by the system, may cause the system to, in response to the indication of actuation of the selectable option, facilitate a chat session between the terminal and the computing device.

In some implementations, the selectable option may be a selectable option to ring or actuate a digital doorbell or indicator.

In some implementations, the instructions, when executed by the system, may cause the system to, in response to the indication of actuation of the selectable option, provide navigational information to the computing device to facilitate location of a meeting point.

In some implementations, the instructions, when executed by the system, may cause the system to, in response to a determination that the computing device is at the premises: transmit a message to the terminal prompting for input indicating confirmation of availability to attend the scheduled appointment; and receive from the terminal an indication of confirmation of availability.

In some implementations, the instructions, when executed by the system, may cause the system to, in response to receiving the indication of confirmation of availability, cause the computing device to provide the selectable option to send the indication signal.

In some implementations, the instructions, when executed by the system, may cause the system to, prior to determining that the computing device is at the premises, schedule the appointment.

In some implementations, the instructions, when executed by the system, may cause the system to, in response to a determination that the computing device is at the premises: determine that the profile associated with the computing device is not associated with an appointment at the premises; and trigger the computing device to provide an option to schedule an appointment.

In some implementations, the determination that the profile corresponds to the scheduled appointment may be based on anonymous information received from the computing device.

In some implementations, the instructions, when executed by the system, may cause the system to generate the anonymous information; and provision the anonymous information to the computing device for transmission to the computer system using an unauthenticated message.

In some implementations, the instructions, when executed by the system, may cause the system to receive the anonymous information from the computing device in an unauthenticated message.

In yet another aspect, the present application describes a computer-implemented notification method. The computer-implemented notification method may include generating anonymous information and associating the anonymous information with a particular profile in a plurality of profiles; during an authenticated state of a software application installed on a computing device, provisioning the software application with the anonymous information; and during an unauthenticated state of the software application: receiving, from the software application, the anonymous information and an indication of detection of the computing device at a premises; and in response to receiving the anonymous information and the indication of detection: selecting the particular profile based on the anonymous information; and transmitting a notification based on the selected particular profile.

In some implementations, the method may further include, during the unauthenticated state of the software application, receiving, from the software application, a location identifier corresponding to the premises, wherein selecting the particular profile is further based on the location identifier.

In some implementations, the method may further include, locating a beacon at the premises and configuring the beacon to emit a signal for reception by the computing device and triggering the software application to automatically transmit the indication and the anonymous information.

In some implementations, the method may further include generating the notification based on stored data corresponding to the particular profile.

In some implementations, the method may further include, during the second authenticated state of the software application, transmitting to the software application a message that has a higher sensitivity level than the notification.

In some implementations, the method may further include triggering the transmission of the notification in response to a determination that the particular profile corresponds to a particular category.

In some implementations, the method may further include categorizing the particular profile as being associated with the particular category by applying a generative artificial intelligence algorithm to at least a portion of a communication to generate an indication of sentiment.

In yet another aspect, the present application describes a computer-implemented method for a digital doorbell-based notification. The computer-implemented notification method may include determining that a computing device is at a premises; determining that a profile associated with the computing device corresponds to a scheduled appointment at the premises with an entity; in response to determining that the profile is associated with the scheduled appointment, causing the computing device to provide a selectable option to send an indication signal; and receiving an indication of actuation of the selectable option and, in response, sending a notification to a terminal associated with the entity indicating that the computing device is at the premises.

In some implementations, the method may further include, in response to the indication of actuation of the selectable option, facilitating a chat session between the terminal and the computing device.

In some implementations, the method may further include, in response to the indication of actuation of the selectable option, providing navigational information to the computing device to facilitate location of a meeting point.

In some implementations, the method may further include, in response to a determination that the computing device is at the premises: transmitting a message to the terminal prompting for input indicating confirmation of availability to attend the scheduled appointment; and receiving from the terminal an indication of confirmation of availability.

In some implementations, the method may further include, in response to receiving the indication of confirmation of availability, causing the computing device to provide the selectable option.

In some implementations, the method may further include, prior to determining that the computing device is at the premises, scheduling the appointment.

In some implementations, the method may further include, in response to a determination that the computing device is at the premises: determining that the profile associated with the computing device is not associated with an appointment at the premises; and triggering the computing device to provide an option to schedule an appointment.

In some implementations, the method may further include generating the anonymous information; and provisioning the anonymous information to the computing device for transmission in an unauthenticated message.

In some implementations, the method may further include receiving the anonymous information from the computing device in an unauthenticated message.

In yet another aspect, present application describes a non-transitory computer-readable storage medium comprising processor-executable instructions which, when executed, may configure one or more processors to generate anonymous information and associate the anonymous information with a particular profile in a plurality of profiles; during an authenticated state of a software application installed on a computing device, provision the software application with the anonymous information; and during an unauthenticated state of the software application: receive, from the software application, the anonymous information and an indication of detection of the computing device at a premises; and in response to receiving the anonymous information and the indication of detection: select the particular profile based on the anonymous information; and transmit a notification based on the selected particular profile.

In yet another aspect, present application describes a non-transitory computer-readable storage medium comprising processor-executable instructions which, when executed, may configure one or more processors to determine that a computing device is at a premises; determine that a profile associated with the computing device corresponds to a scheduled appointment at the premises with an entity; in response to a determination that the profile is associated with the scheduled appointment, cause the computing device to provide a selectable option to send an indication signal; and receive an indication of actuation of the selectable option and, in response, send a notification to a terminal associated with the entity indicating that the computing device is at the premises.

In yet a further aspect, the present application describes a non-transitory computer-readable storage medium storing processor-readable instructions that, when executed, configure one or more processors to perform any of the methods described herein. Also described in the present application is a computing device comprising: one or more processors, memory, and an application containing processor-executable instructions that, when executed, cause the one or more processors to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The terms "real-time" and "near real-time" means that an action and a response are temporally proximate such that an individual perceives the action and the response occurring substantially simultaneously. For example, the time difference for a response to display (or for an initiation of a display) of data following the individual's action to access the data may be less than 1 millisecond, less than 1 second, or less than 5 seconds.

In the present application, reference may be made to the term "anonymous information". Anonymous information may be information that does not identify a particular entity and does not contain personal information, user information, or sensitive data. It may be information that has been sanitized. It also may not be included in authentication information used to log into a software application.

The anonymous information may be or include an anonymous, probabilistic and/or nondeterministic identifier.

A deterministic identifier may include data that identifies a specific entity. Example deterministic identifiers include a name, email address, login identifier and customer identifier. A deterministic identifier may include first-party data gathered directly from user input, for example, by logging in with a name or email address. A deterministic identifier may be used to determine with certainty that the identifier relates to a particular user. A deterministic identifier may contain personally identifiable information, which may raise privacy concerns.

In contrast, a probabilistic identifier, which is sometimes referred to as a nondeterministic identifier, may include only anonymous data and contain no personally identifiable information. It may not be possible to determine with certainty who the anonymous data pertains to. A probabilistic identifier may be used to assume or predict the entity corresponding to the probabilistic identifier. A probabilistic identifier may be considered less reliable than a deterministic identifier.

Example embodiments of the present application are not limited to any particular operating system, system architecture, mobile device architecture, server architecture, or computer programming language.

FIG. 1 shows a schematic diagram illustrating an operating environment of an example embodiment. The operating environment in this example includes a premises 102, beacon device 110, mobile device 120, notification system 140, and terminal device 150. In some embodiments, the operating environment may include a plurality of mobile devices, which may include the mobile device 120.

The premises 102 may be a building or property. A beacon device 110 may be installed at the premises 102. The beacon device 110 may be stationary and attached to a building at the premises 102. For example, the beacon device may be attached near an entrance of a branch of a financial institution. In some embodiments, the beacon device 110 may be implemented as a Bluetooth™ low energy device.

The beacon device 110 may provide proximity-based location data to a nearby mobile device 120. The beacon device 110 may only emit signal and not receive data back. The transmitted signal may be received by a mobile device 120. In some embodiments, the beacon device 110 may transmit up to approximately 30 meters without any physical obstructions.

The beacon device 110 may be used for proximity detection, for example, where exact location coordinates, such as longitude and latitude, are not required. The signal emitted by the beacon device 110 may include a location identifier. For example, the signal may include a transit number identifying the branch of the financial institution.

The beacon device 110 may include an antenna omni directional antenna for advertising location information. A receiver device, such as for example the mobile device 120, may include an onboard radio to detect when the receiver device is in the vicinity of beacon device 110 that is advertising location information.

In some embodiments, the mobile device 120 may detect entry into a region by the mobile device 120. A region may be a geographic region or a beacon region. A geographic region may be an area defined by a geographics coordinate system (GCS). A beacon region may be an area defined by the transmission distance of a signal emitted from a beacon device 110.

The mobile device 120 may be associated with an entity, such as a user of the mobile device. The entity may have one or more profiles and/or accounts that may be stored in a data store 141 associated with, provided by and/or corresponding to the notification system 140. Each profile may also include a record that may be or represent account data or other data maintained by the notification system 140. The record may include data of various types and the nature of the data will depend on the nature of the notification system 140. By way of example, in some implementations, the record may include, for example, documents and/or other data stored by or on behalf of a user. Such documents and/or data may include, for example, any one or more of: digital identity data such as stored identity information or documentation, transactional information, user preferences, or other types of documents and/or data. The transactional information may include historical data transfers for the account.

The notification system 140 may be configured to verify authentication information received from the mobile device 120 as corresponding to one or more profiles, accounts and/or authentication data maintained by the notification system 140. The notification system 140 may detect the presence of the mobile device 120 at a premises and, in response, transmit a notification to the mobile device 120 and terminal device 150.

The notification system 140 may be managed, operated, controlled by and/or associated with an entity that is an agent of an account holder, which may be a user of the mobile device 120. The account holder may also be a customer (e.g. a corporate/business customer) or client of the entity or otherwise associated with the entity. The entity may be a financial institution, such as a bank. In many of the examples herein, financial institutions may be referenced to illustrate concepts, but the present application is not necessarily solely applicable to financial institutions.

The notification system 140 may include transfer processing systems. A transfer processing system may include a transfer processing module implemented as a software module and configured to process transfers such as transfers identified in transfer messages. By way of example, a processing module or system included in the notification system 140 may be configured to perform internal transfers by transferring value between two different records in the data store 141 (i.e., between two accounts at the same financial institution) and/or to perform external transfers by interacting with one or more third-party systems. For example, external transfers may be performed using various transfer methods or protocols. In some implementations, at least some transfers may be performed by interacting with other financial institution systems via a SWIFT (Society for Worldwide Interbank Financial Telecommunication) network.

A transfer may involve a transfer of resources, which may include physical assets, credits, tokenized items like non-fungible tokens, or any other resource that may be owned or credited to an account associated with an account holder. An account may hold or store resources for transfer to and/or from the account and is sometimes referred to as a resource account, financial account or debit account that allows a customer to withdraw money or make purchases using funds or resources that have been deposited into the account. In many of the examples herein, monetary resources may be referenced to illustrate concepts, but the present application is not necessarily solely applicable to financial or monetary instruments or resources.

The terminal device 150 may be managed and/or controlled by the same entity as the notification system 140. The entity may be an employer of the operator of the terminal device 150. In some embodiments, the operator may be a customer service representative employed by the entity.

As illustrated, the notification system 140 is in communication with the mobile device 120 and terminal device 150 via the network 130. The mobile device 120, notification system 140 and/or terminal device 150 may be configured to transmit and receive messages between each other.

The mobile device 120, notification system 140, and terminal device 150 may be configured to ingest data from each other and may transmit requests, replies, alerts, notifications, configuration objects, or other data to each other. The notification system 140 may store data in the data store 141. The mobile device 120 and terminal device 150 may obtain data stored in the data store 141 via the notification system 140. The data store 141 is illustrated as a single unit for ease of illustration, but may include a plurality of storage units and, in some cases, storage media connected via the network 130.

The mobile device 120 is a computing device and may be configured to receive input. It may, as illustrated, be a smart phone. However, the mobile device 120 may be a computing device of another type such as, for example, a mobile device, a desktop computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The notification system 140 may be or include a computer system such as a computer server system, database management system, resource management systems, or data transfer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, web servers, email servers, file transfer protocol (FTP) servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The terminal device 150 is a computing device and may be configured to receive input and display output. It may, as illustrated, be a client terminal. However, the terminal device 150 may be any other suitable device such as, for example, a mobile device, a desktop computer, or a laptop computer.

The mobile device 120, notification system 140, and terminal device 150 may be in geographically disparate locations. In at least some embodiments, the mobile device 120 may enter the premises 102, the terminal device 150 may be located at the premises 102, and the notification system 140 may be remote from the premises 102.

The network 130 is a computer network. The network 130 may be an internetwork such as may be formed of one or more interconnected computer networks. For example, such a network may be or may include an Ethernet network, an asynchronous transfer mode (ATM) network, a wireless network, or the like. In some implementations, the network 130 may be the Internet. One example of a wireless network is a cellular network. Another example of a wireless network is a close proximity (i.e. personal area) wireless network, sometimes referred to as a wireless personal area network (WPAN). Examples of WPANs include Bluetooth™ and Zigbee™. The network 130 may facilitate communication between the mobile device 120, beacon device 110, notification system 140 and terminal device 150.

As further described below, the beacon device 110, mobile device 120, notification system 140 and terminal device 150 may be configured with software to perform associated functions such as those described herein.

FIG. 1 illustrates the beacon device 110, notification system 140, terminal device 150 and data store 141 as separate and distinct computing devices. However, these systems may not all be separate physical systems. For example, the notification system 140 and the data store 141 may be implemented on a common physical device. The beacon device 110 and terminal device 150 may also be included in the notification system 140. One or more of the premises 102, beacon device 110, notification system 140, and terminal device 150 may be managed, operated, and/or controlled by a same entity.

Figure 2:
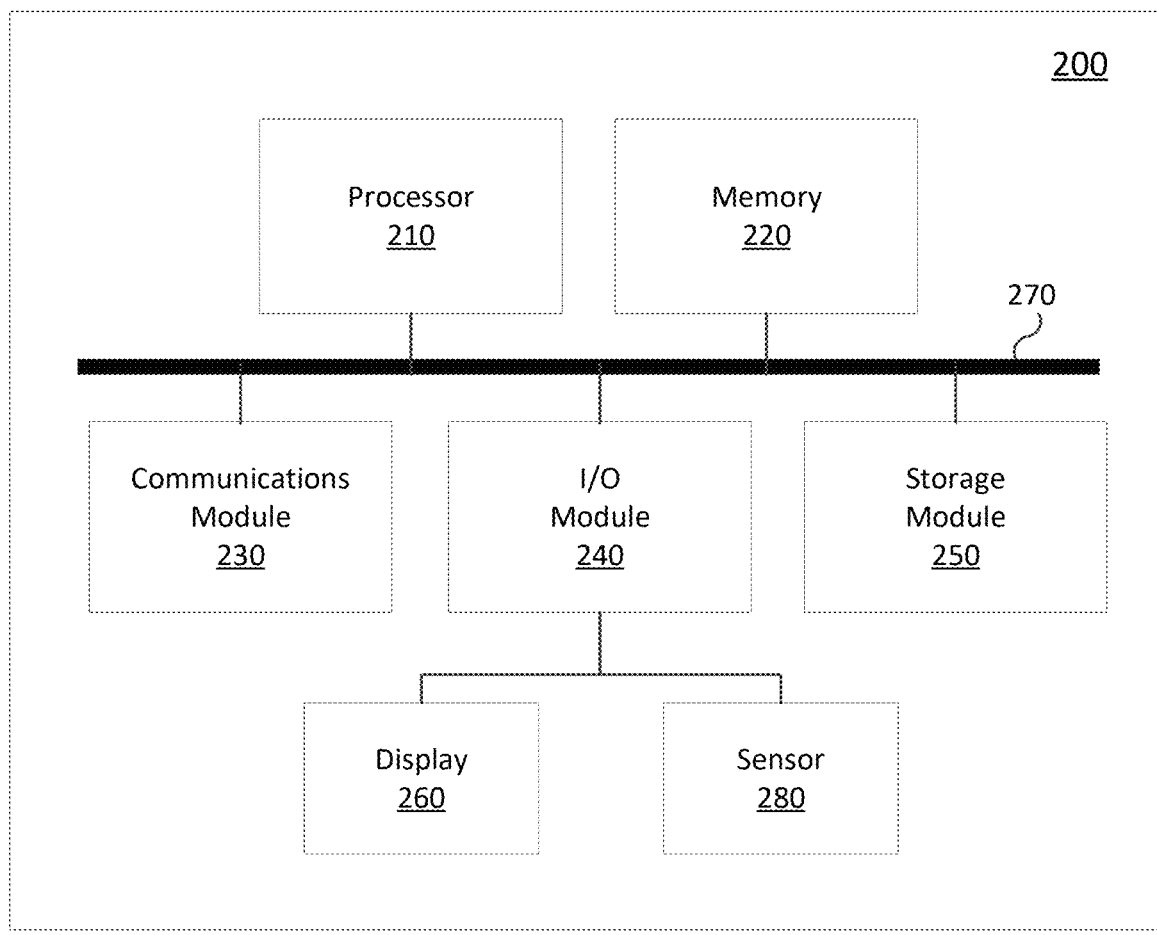
FIG. 2 shows a high-level schematic diagram of the beacon device, mobile device, notification system and terminal device of FIG. 1.

FIG. 2 is a high-level schematic diagram of an example computing device 200. In some embodiments, the example computing device 200 may be exemplary of the mobile device 120, beacon device 110, notification system 140 and/or the terminal device 150 in the example operating environment 100 of FIG. 1.

The example computing device 200 includes a variety of modules. A module may include one or more modules and may be a subsystem. In some cases, a module is a hardware module and may be integrated into or include an electronic circuit.

As illustrated, the example computing device 200 may include a processor 210, a memory 220, a communications module 230, an I/O module 240, a storage module 250 and/or a display 260. As illustrated, the foregoing example modules of the example computing device 200 are in communication over a bus 270. As such, the bus 270 may be considered to couple the various modules of the mobile device 120 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks such as, for example, the network 130. For example, the communications module 230 may allow the example computing device 200 to send or receive communications signals. Communications signals may be sent or received according to one or more protocols or according to one or more standards. The communications module 230 may allow the example computing device 200 to communicate via one or more wireless networks, such as for example, a cellular wireless network, according to one or more standards such as, for example, Global System for Mobile Communications (GSM), Code Division Multiple Access (CDMA), Evolution Data Optimized (EVDO), Long-term Evolution (LTE), or 5G. Additionally or alternatively, the communications module 230 may allow the example computing device 200 to communicate via a wireless personal area network (WPAN) via some combination of one or more networks or protocols such as, for example, Bluetooth™ and Zigbee™. In some embodiments, all or a portion of the communications module 230 may be integrated into a component of the example computing device 200. For example, the communications module 230 may be integrated into a communications chipset or circuit.

The I/O module 240 is an input/output module. The I/O module 240 allows the mobile device 120 to receive input from and/or to provide input to components of the example computing device 200 such as, for example, various input modules and output modules. For example, the I/O module 240 may, as shown, allow the example computing device 200 to receive input from and/or provide output to the display 260.

Additionally, the I/O module 240 may receive input from a sensor module 280 that may be a sensor that gathers and generates sensor data based on a sensed condition. By way of example, the sensor module 280 may be or include a location subsystem that generates location data. The location data may define a location, which may be the current geographic location of the computing device 200. In some embodiments, the sensor module 280 may generate location events, such as when the computing device 200 enters or leaves a region.

The sensor module 280 may utilize and may include or may interact with a receiver of one or more of satellite-based location systems, such as, for example, global positioning satellite (GPS), GLONASS, BeiDou Navigation Satellite System (BDS), and/or Galileo in order to locate the computing device 200. Additionally or alternatively, the sensor module 280 may employ other techniques/technologies for location determination such as, for example, an inertial navigation system (INS), a wireless (e.g., cellular, Wi-Fi™) triangulation system, use of wireless (e.g., Wi-Fi™) hotspot location data, a beacon-based location system (such as a Bluetooth™ low energy beacon system), and/or a location subsystem of another type. In some embodiments, the sensor module 280 may be included in the communications module 230 such as, for example, where cell-tower triangulation and/or wireless hotspot location data is employed in determining location.

The storage module 250 allows the example computing device 200 to store and retrieve data and, in some embodiments, may be referred to as a data store or data facility. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 230. In some embodiments, the storage module 250 may be omitted and its function may be performed by the memory 220 and/or by the processor 210 in concert with the communications module 230 such as, for example, if data is stored remotely. The storage module 250 is illustrated as a single unit for ease of illustration, but may include a plurality of storage units.

The example computing device 200 may include or be connected to a display 260. The display 260 is a module of the example computing device 200. The display 260 is for presenting graphics and displaying graphical user interfaces. The display 260 may be, for example, a liquid crystal display (LCD). In addition to being an output device, the display 260 may also be an input device. For example, the display 260 may allow touch input to be provided to the example computing device 200.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
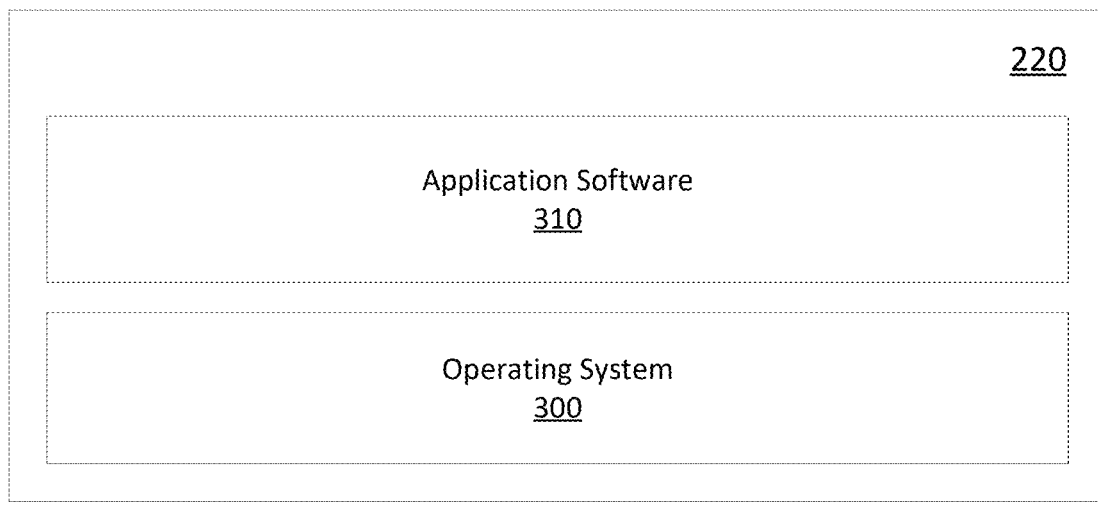
FIG. 3 shows a simplified organization of software modules stored in a memory of the example computing systems of FIG. 2.

FIG. 3 depicts a simplified organization of software modules stored in the memory 220 of the example computing device 200 of FIG. 2. As illustrated, these software modules include an operating system 300 and application software 310.

The operating system 300 is software. The operating system 300 allows the application software 310 to access the processor 210, the memory 220, the communications module 230, the I/O module 240, and the storage module 250 of the example computing device 200. The operating system 300 may be, for example, Google™ Android™, Apple™ iOS™, UNIX™, Linux™, Microsoft™ Windows™, Apple OSX™ or the like.

The application software 310, when executed, co-operates with the operating system 300 to adapt the example computing device 200 for some purpose and to provide some defined functionality. For example, the application software 310 may cooperate with the operating system 300 to adapt a suitable embodiment of the example computing device 200 to serve as a client of, or provide a service to, another embodiment of the example computing device 200.

A software module may include or use one or more application programming interfaces (APIs). An application programming interface may facilitate communication between software modules and may be capable of transferring data between software modules. For example, in some embodiments, the application programming interface may be used to connect to and transfer data to and/or from one or more computing systems. The example computing device 200 may store connection data associated with the application programming interface, such as an identifier identifying a computing device or system. In some cases, the identifier may be or include a server identifier, such as, for example, an Internet Protocol (IP) address or domain name. The identifier may be used in conjunction with the application programming interface to establish a connection with the computing system.

The application programming interface may be configured to receive application programming interface requests that define parameters. The application programming interface may perform operations to obtain data to fulfill the application programming interface requests.

The application programming interface may utilize a particular messaging protocol (e.g., a Representation State Transfer (REST) API (RESTful API) or a Simple Object Access Protocol (SOAP) API). Using the application programming interface may include generating a message in conformity with the particular messaging protocol for invoking the application programming interface.

Figure 4:
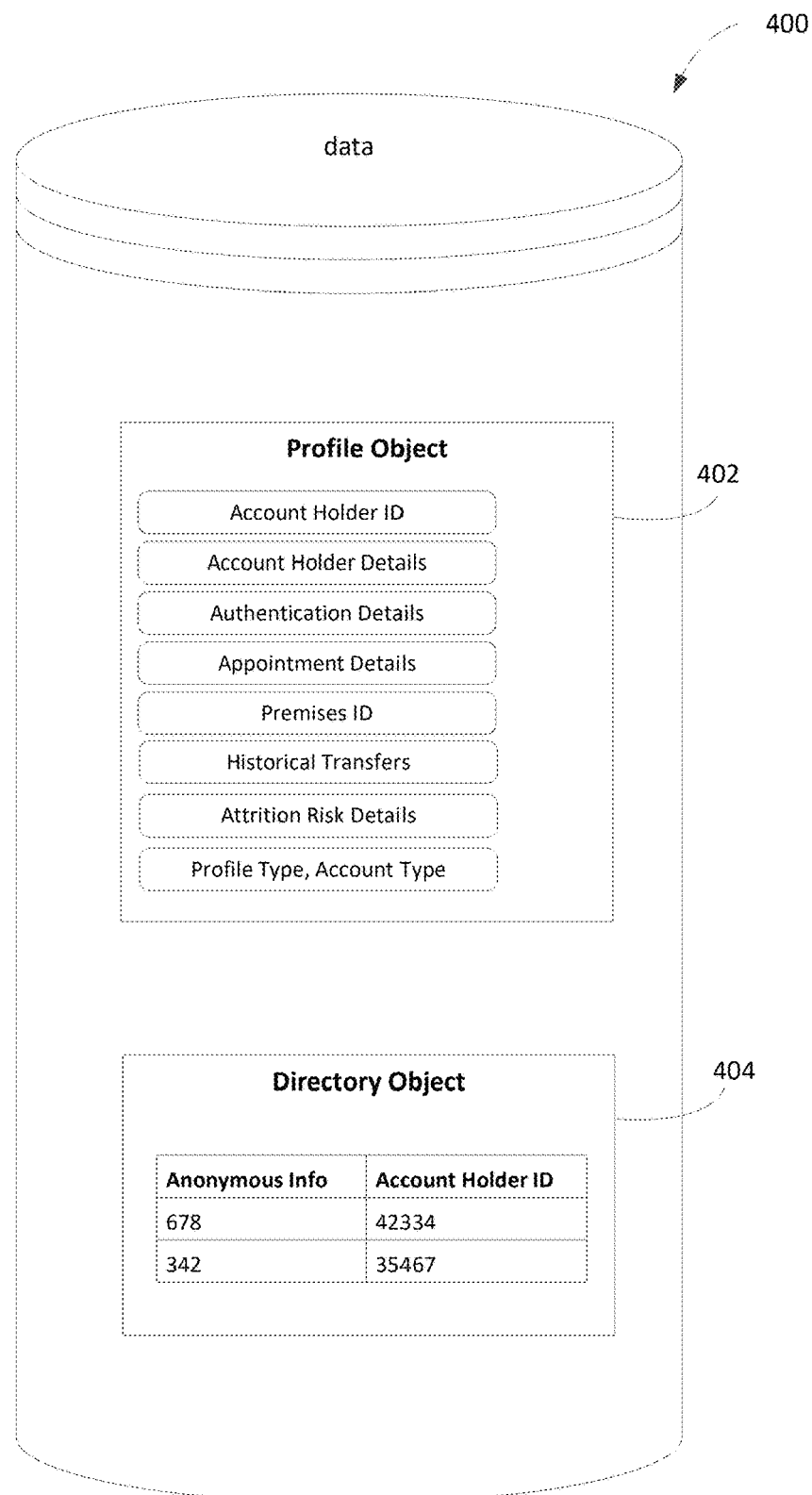
FIG. 4 shows, in block diagram form, an example embodiment of the data store of FIG. 1.

Reference is now made to FIG. 4, which partially illustrates an example data store 400 in block diagram form. The data store 400 may be a data store 141 of the notification system 140 of FIG. 1. Not all components of the data store 400 are illustrated. The data store 400 may include one or more data storage units. In some cases, the stored data may be in a database format and may include one or more databases. The databases may be relational databases in some examples. The data store may store data regarding one or more profile objects 402 and a directory object 404, each of which may be a data structure.

The data store 400 may store data regarding an account holder in a profile object 402. A profile object 402 may also include details regarding a holder of an account. Example details include an account holder identifier indicating a particular person or entity, identification information (e.g. full name, including first and last name), contact information (e.g. phone number, email address, street address), and an account type.

A profile object 402 may also include additional details related to the holder of the account, such as authentication details, appointment details, a premises identifier, information regarding one or more historical transfers, and attrition risk details.

Authentication details may include sign in or one more credentials such as, for example, username, password, access card number, shared secret, and/or biometric data such as a fingerprint, voiceprint and/or facial profile data. In some embodiments, the account holder may be or represent a user or customer. Authentication may be performed based on one or more credentials. Appointment details may include an appointment time and location.

The premises identifier may be a location identifier and identify a particular branch that the account holder is registered with.

The attrition risk details may include an attrition risk level, a sentiment and/or an event summary. The attrition risk level may indicate a level of risk that the account holder will no longer be a customer and will leave for a competitor. The event summary may include a text-based description of an event related to the attrition risk level. For example, if the attrition risk level is high, the event summary may provide details regarding an event that contributed to the high attrition risk.

The data store 400 may further include in a directory object 404 that may store data regarding an association of anonymous information to a profile. The directory object 404 may map or link anonymous information to a profile. Anonymous information may be used to lookup a profile. For instance, the anonymous information may map to an identifier of an account holder. The account holder identifier may identify a particular profile.

Figure 5:
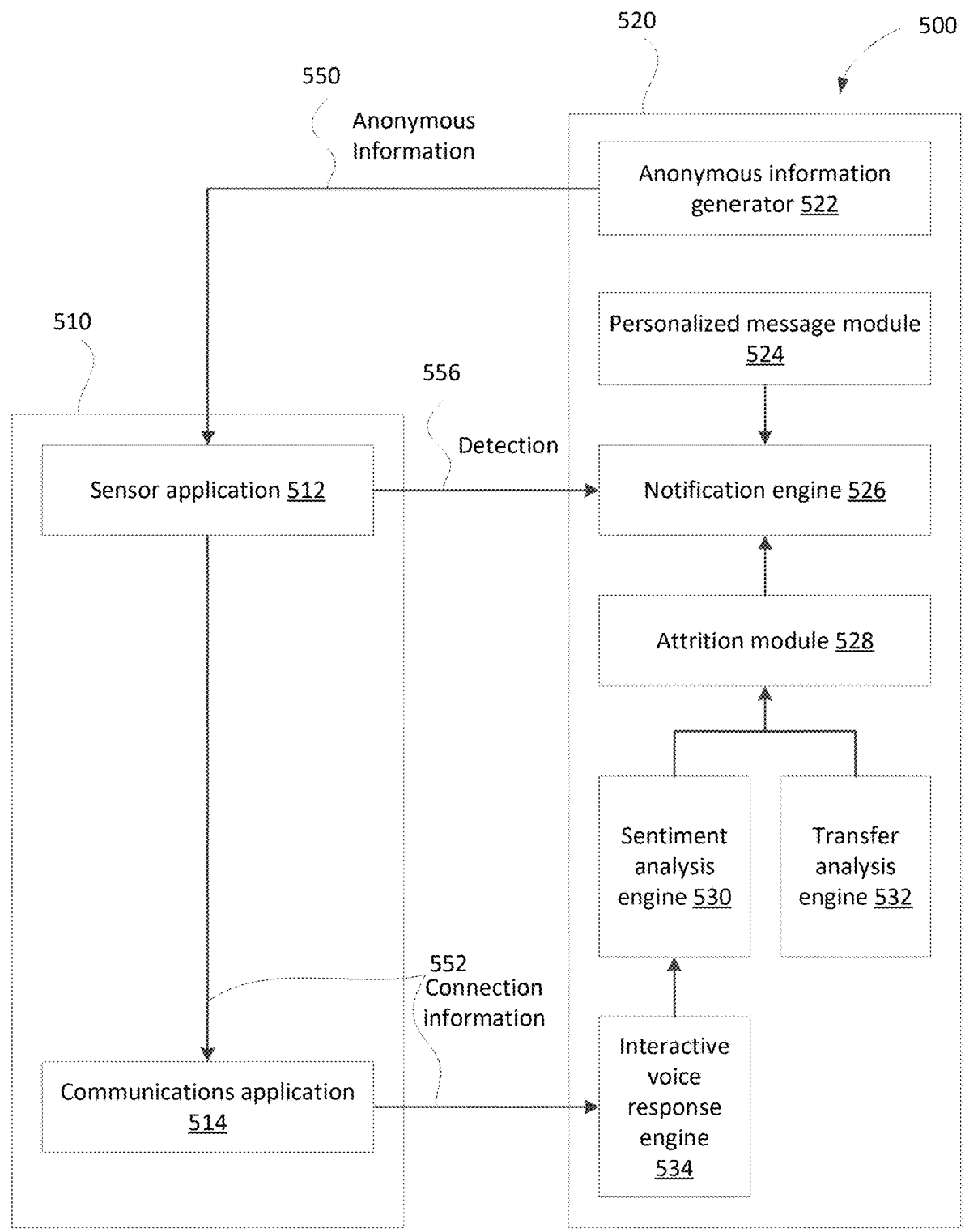
FIG. 5 is a block diagram illustrating a simplified example computing device and a simplified example computing system in which methods and devices in accordance with the present description may be implemented.

Reference is now also made to FIG. 5, which illustrates a simplified example computing device 510 and a simplified example computing system 520 in which methods and devices in accordance with the present description may be implemented. The computing device 510 and the computing system 520 may be or include the mobile device 120 and the notification system 140, respectively, in the example operating environment 100 of FIG. 1.

The computing system 520 may include an anonymous information generator. The anonymous information 550 may be generated in a format that is suitable for use as automated input to the interactive voice response engine 534 by, for example, appending the anonymous information 550 to a telephone number corresponding an interactive voice response (IVR) engine 534. The anonymous information 550 may be generated using, for example, a pseudorandom number generator or a hardware random number generator, that creates a number to be used as the anonymous information.

The computing system 520 may send the generated anonymous information 550 to a sensor application 512 included in the computing device 510. The sensor application 512 may send connection information 552 that includes the anonymous information 550 to a communications application 514. In some embodiments, the connection information 552 may include a telephone number for establishing a connection between the communications application 514 and the interactive voice response engine 534.

The computing device 510 may send the anonymous information 550 back to the computing system 520 via the sensor application 512 and/or the communications application 514.

In the case of the sensor application 512, the anonymous information 550 may be sent back to the computing system 520 when the sensor application 512 is in an unauthenticated state and the sensor application 512 detects the entry of the computing device 510 in a monitored region.

In the case of the communications application 514, the anonymous information 550 may be sent back to the computing system 520 when the communications application 514 uses the connection information 552 to connect with computing system 520.

The sensor application 512 may be configured to collect or capture information. In one example, the sensor application 512 includes a monitoring application for monitoring the location of the computing device 510, including its position relative to a beacon device. For example, the sensor application may use a framework for gathering data using modules on the computing device 510, including a sensor module. The sensor application 512 may monitor a defined region of interest and generate events when the computing device 510 enters or leaves those regions.

The sensor application 512 may include a detection facility for collecting event information indicating the location of the computing device 510. The detection facility may be configured to detect and locate a nearby beacon device.

In one example, the sensor application 512 includes a monitoring application for monitoring the location of the computing device 510 and the computing device's entry into a specific region. The monitoring application may run as a background process and provide a location service to the sensor application 512. In some cases, the sensor application 512 may use a location service provided by an operating system installed on the computing device 510. The sensor application 512 may register a region with the location service, for example, by providing the location service with a location identifier. When entry into the region is detected, the location service may provide the sensor application 512 with an alert. If entry into the region is detected while the sensor application 512 is not running, the location service may launch the sensor application 512 to handle the entry event as a background process. Similarly, if the entry event occurs while the sensor application 512 is suspended, the location service may wake the sensor application 512 up to handle the event. In some embodiments, the sensor application 512 may run continuously as a background process to handle entry events. In this way, the computing device 510 may detect the presence of a beacon device when the computing device 510 is near an entrance of the premises.

The computing device 510 may include a communications application 514 for communicating with the computing system 520. The communications application 514 may be, for example, a phone application and provide phone services, such as making and receiving phone calls. The communications application 514 may initiate a call to the computing system 520 using connection information 552 received from the sensor application 512. In some embodiments, the communications application 514 may automatically append the anonymous information 550 to a phone number used to connect with the interactive voice response engine 534.

The interactive voice response engine 522 is an automated phone subsystem that may interact with callers and gather information by presenting callers with choices through a menu. The interactive voice response engine 522 may take one or more actions based on the response of the caller through input received via a telephone keypad or a voice response. In some embodiments, the interactive voice response engine 522 may route a call to a human agent, for example a call center agent, for further assistance. For example, the interactive voice response engine 522 may route a call to the terminal device 150 in the example operating environment 100 of FIG. 1 for handling by a customer service representative and operator of the terminal device 150.

The interactive voice response engine 522 may be configured to obtain the anonymous information 550 that is appended to the phone number used to connect with the interactive voice response engine 522. The interactive voice response engine 522 may use the anonymous information 550 to identify a profile corresponding to the connection and the computing device 510. In some embodiments, the interactive voice response engine 522 may use the anonymous information 550 to identify a profile that corresponds to the anonymous information 550 by using the anonymous information 550 to lookup a profile identifier in a profile directory.

Input received during a connection established between the interactive voice response engine 534 and the communications application 514 may be provided to a sentiment analysis engine 530 included in the computing system 520. The sentiment analysis engine 530 may analyze input received by the computing system 520 to determine a sentiment expressed by an individual in the input. The input may be received, for example, from the computing device 510. The determined sentiment may be positive, negative, or neutral, and may be calculated by assigning a sentiment score based on a defined scale. The determined sentiment may correspond to the identified profile and be stored in a profile object corresponding to the identified profile.

The input may be or include unstructured, natural language content or data in text, audio or multimedia form. In some embodiments, if the input is not in text form, the sentiment analysis engine 530 may use a transcriber module that converts the non-text input (such as audio input) into text input. To that end, the sentiment analysis engine 530 may include a transcriber. The transcriber may be a speech-to-text application that is configured to automatically convert the audio input into a text format. The transcriber may be a machine learning model trained to convert audio into text in real time as the computing system 520 receives the input.

The sentiment analysis engine 530 may be or include a natural language processing engine adapted to receive the input. The natural language processing engine may identify a sentiment based on the input. The sentiment may be considered the result of applying a mapping between unstructured natural language data and a set of possible classifications (sentiments) to the input. The natural language processing engine may detect, for example, anger, disgust, fear, joy, or sadness that is conveyed in the content.

The natural language processing engine may operate in a variety of manners and may, in some embodiments, employ known natural language processing techniques. For example, support vector machines (SVMs) and/or convolutional neural networks (CNNs) may be employed by the natural language processing engine. In some implementations, the natural language processing engine may correspond to and/or may employ one or more commercially-available machine learning-based software packages or services for natural language classification and/or understanding. For example, one or more of the IBM Watson™ Natural Language Classifier or IBM Watson™ Natural Language Understanding available from International Business Machines Corp (IBM) of Armonk, N.Y., USA; the Microsoft Language Understanding Intelligence Services (LUIS) available from Microsoft Corporation of Redmond, Wash., USA; and/or Apache OpenNLP available from the Apache Software Foundation of Forest Hill, Md., USA, may be employed in a given implementation of the natural language processing engine. In a particular example, the natural language processing engine may employ one or more natural-language processing neural networks. Such neural networks and, more broadly, the natural language processing engine 202 may, in some embodiments, be trained, at least initially using a training set (a data set for training) including training data describing the circumstances of customer and corresponding sentiment determinations. Some or all of that training data may correspond to the circumstances of hypothetical customer attrition. The corresponding sentiments and/or determinations of sentiment may be determined in a variety of manners including, for example, by trained experts reviewing that training data and/or the circumstances of the corresponding hypothetical and/or historical customer attrition events and applying sentiment-determination rules.

In some embodiments, the sentiment analysis engine 530 may include a large language model (LLM) trained to perform natural language processing tasks such as classification. The large language model may also be used for generative artificial intelligence (AI) to generate text from media including natural language content. For example, generative artificial intelligence may be used to generate a summary of natural language content included in the input. The summary may provide a short description of an issue relating to a negative sentiment detected in the input.

In some implementations, the large language model may correspond to and/or may employ one or more commercially-available language model software packages or services. For example, one or more of OpenAI's GPT series of models available from OpenAI of San Francisco, California, USA and/or the Gemini family of multimodal large languages models available from DeepMind Technologies Limited of London, England may be employed in a given implementation of the language model.

The sentiment analysis engine 530 may also include a language translator providing multilingual support to enable sentiment analysis across different languages. The language translator may translate text from one language to another.

The sentiment analysis engine 530 may also include a tone analyzer to detect emotional and language tones in text, audio, or video. For example, the tone analyzer may detect a negative tone in voice. The tone analyzer may provide an understanding of the sentiment underlying the input and communications received from a customer or user.

The attrition module 528 may take the sentiment provided by the sentiment analysis engine 530 and determine an attrition risk level. The determined risk level may be high, low, or neutral, and may be calculated by assigning a risk score based on a defined scale. The determined risk level may correspond to the profile identified by the interactive voice response engine 534 and may be stored in a profile object corresponding to the identified profile.

The risk level may be determined based on various factors. For example, the risk level may be based on a sentiment determined by the sentiment analysis engine 530 and/or one or more factors identified by a transfer analysis engine 532. In some embodiments, an attrition risk level is determined to be high if an angry sentiment is detected and/or if the one or more transfer factors is detected.

The computing system 520 may also include a transfer analysis engine 532. The transfer analysis engine 532 may use transaction data to assess whether an entity corresponding to a profile is at risk of attrition. The transaction data should correspond to the profile and may be analyzed by an artificial intelligence system or by a rules-based system. An artificial intelligence system trained to detect one or more transfer events indicative of an attrition risk. A rules-based system may identify factors such as, for example, transfers out of an account corresponding to the profile, less frequent use of the account, and payroll deposits or other recurring transfers that are no longer being made to the account. Detection of any of these factors may be indicative of a risk of attrition. The transfer analysis engine 532 may include a monitoring system that monitors transactions in real-time to detect the presence of a risk factor.

The computing system 520 may also include a notification engine 526. The notification engine 526 may determine whether to generate and send a notification to another system, such as the computing device 510. The notification engine 526 may receive a detection message 556 from a sensor application 512 indicating that the computing device 510 has been detected in a monitored region. The detection message 556 may include the anonymous information 550.

In response, the notification engine 526 may obtain a personalized message from the personalized message module 524 and transmit the personalized message to the computing device 510 in reply.

The personalized message module 524 may generate and obtain personalized message corresponding to a profile associated with the computing device 510. The personalized message module 524 may store a plurality of messages. Each particular message in the plurality of messages may have an assigned rating. The assigned rating may indicate a level of sensitivity of the message. Messages may be retrieved from the personalized message module 524 by the notification engine 526 based on the sensitivity rating and the authentication state of the sensor application 512. For example, if the sensor application 512 is in an unauthenticated state, then a message that has a non-sensitive rating and contains only non-sensitive content may be retrieved. If the sensor application 512 is in an authenticated state, then a message that has a sensitive rating and contains sensitive content may be retrieved.

It will be appreciated that although the sensor application 512 and the communications application 514 of the computing device 510 are illustrated as separate applications for ease of explanation, they may be implemented as separate software applications or modules, or partially or completely together as one software application or module, within or outside of the computing device 510. It will also be appreciated that although the various components of the computing system 520 are illustrated as separate elements for ease of explanation, they may be implemented as separate software applications or modules, or partially or completely together as one software application or module, within or outside of the computing system 520.

Figure 6:
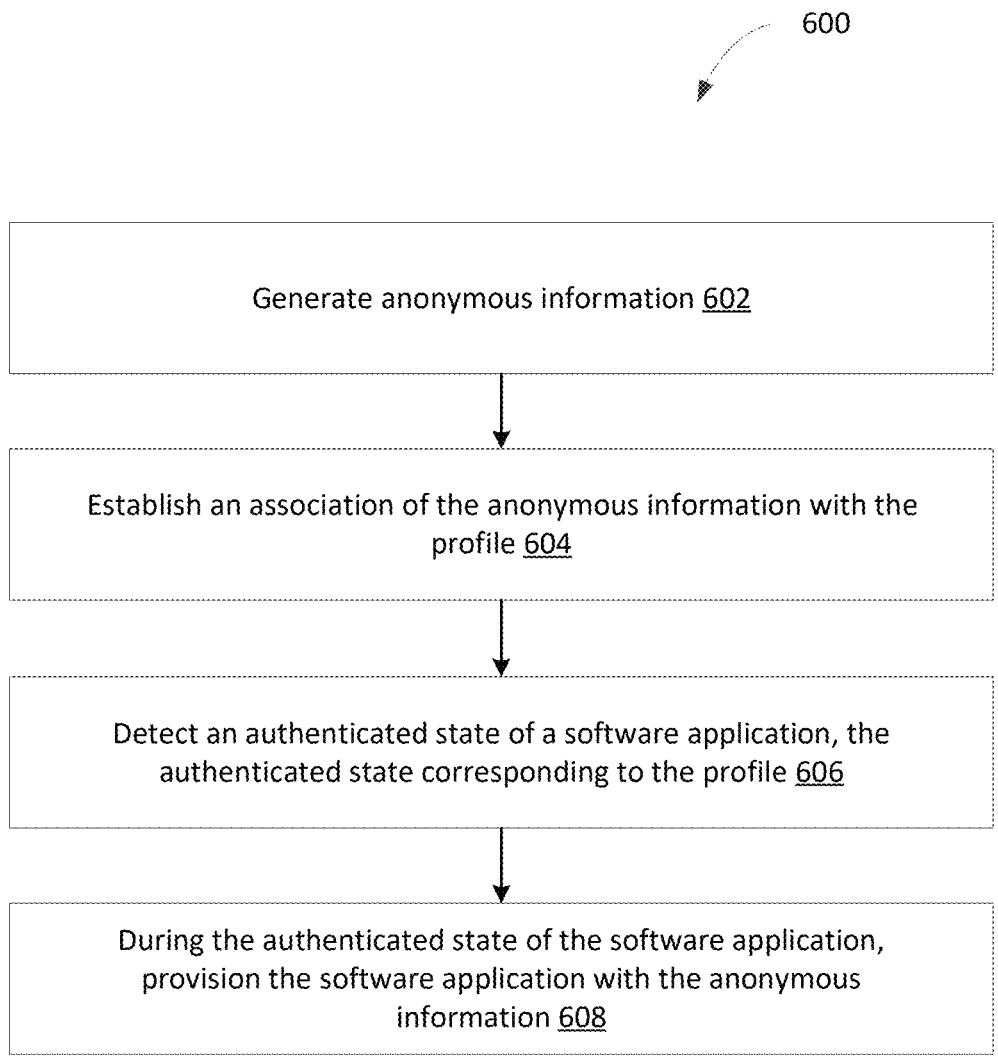
FIG. 6 shows, in flowchart form, a method of provisioning a software application installed on the mobile device with anonymous information, according to an example embodiment.

Reference will now be made to FIG. 6 which illustrates an example method 600 for provisioning a software application with anonymous data. The method 600 may be implemented by one or more computer systems suitably programmed to carry out the functions described. The operations of the example method 600 may be performed by one or more computer systems which may be of the type described herein. In some embodiments, the operations may be performed by the notification system 140 of FIG. 1, which may communicate with a mobile device 120 in order to perform the method 600 or a variation thereof.

In operation 602, the system generates anonymous information. In at least some embodiments, the anonymous information may be a random numeric value.

In operation 604, the system establishes an association of the anonymous information with a profile. In some cases, the anonymous information is linked or mapped to the profile. In some embodiments, this operation may involve adding the anonymous information to a directory, upon which an association is established between the anonymous information and a profile.

Various techniques and data structures may be implemented to establish and manage an association between anonymous information and a profile. In some embodiments, the association is implemented as a table or two-dimensional array, where one column contains the anonymous information and the other column the corresponding identifier of a profile. The table may, for example, be stored as a directory object 404 in the data store 400 in FIG. 4. In some implementations, the number of entries of anonymous information in the set of associations may range from hundreds to thousands to millions. Since a linear search may be inefficient for large numbers of entries, the table may be indexed by anonymous information. Since the anonymous information should be unique in the table and not already exist in the table, searching for the anonymous information may be performed using a sub-linear time lookup.

The operations of adding anonymous information to a set of associations associated with a profile and/or establishing the association between the anonymous information and the profile in the set of associations may sometimes be referred to as "associating" the anonymous information with the profile.

In operation 604, the system detects an authenticated state of a software application. The software application may, for example, correspond to the sensor application 512 installed on the computing device 510 of FIG. 5.

In some embodiments, the detection of the authenticated state may involve receiving a message from the software application including an indication of the authentication state of the software application. For example, the message may include one or more parameters. The parameters may include a state parameter indicating an authentication state of the software application. The state parameter may indicate an "authenticated" state where a user has successfully authenticated with the profile. Conversely, the state parameter may indicate an "unauthenticated" state where no user is currently authenticated with the software application, for example, by logging in to the software application.

In some embodiments, the detection of the authenticated state may involve authenticating a user of the software application. For example, the software application may provide a graphical user interface that prompts a user to authenticate. The software application may gather authentication information via, for example, input provided via a login interface. The authentication information may include, for example, a credential for a user. The credential may be one or more of: a token, a username, biometric data, and/or a password.

The software application may send the authentication information to the system. The system may include an authentication module that is configured to receive and authenticate the authentication information as corresponding to the particular profile associated with the anonymous information.

In some embodiments, the authentication module may use the authentication information to identify a particular profile in a plurality of profiles. For example, the authentication information may include an account holder identifier, such as a username, identifying the profile. The authentication module may also verify that the authentication information corresponds to the identified profile. For example, the authentication module may verify that a password included in the authentication information is the same as a password included in the profile.

In some embodiments, the authentication module may validate the authentication information by comparing the received authentication information with authentication details included in one or more profiles and, based on the comparison, determine that the received authentication information matches or corresponds to authentication details included in a particular profile.

In response to authentication of the user of the computing device and software application, the system may send a message to the software application indicating successful authentication corresponding to the profile associated with the anonymous information.

In operation 606, the system provisions the software application with the anonymous information. The provisioning should occur during the authenticated state of the software application. During the authenticated state of the software application, the system may transfer to the software application a message including the anonymous information. The software application may receive the message and store the anonymous information in a data store for use during an unauthenticated state of the software application. In some embodiments, the software application may also be provisioned with a location identifier that may be associated with or defined by the particular profile.

Figure 7:
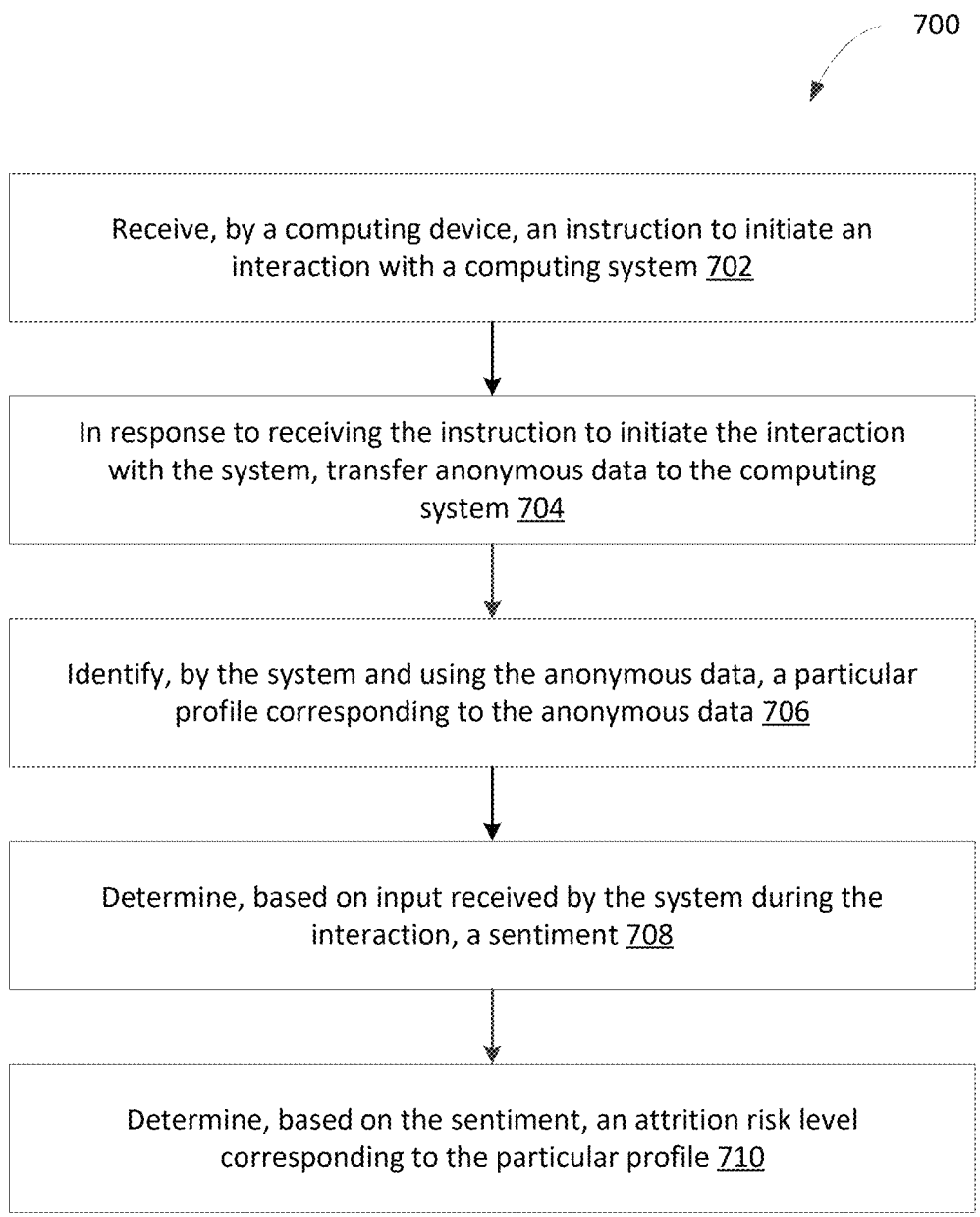
FIG. 7 shows, in flowchart form, an example method of determining an attrition risk level, according to an example embodiment.

Reference will now be made to FIG. 7 which illustrates an example method 700 for determining an attrition risk level. The method 700 may be implemented by one or more computer systems suitably programmed to carry out the functions described. The operations of the example method 700 may be performed by one or more computer systems which may be of the type described herein. In some embodiments, one or more of the operations may be carried out by the mobile device 120 and the notification system 140 in the example operating environment 100 described in FIG. 1. In this example, the mobile device 120 may be referred to as a computing device and the notification system may be referred to as a computing system. In some embodiments, aspects of one or more operations 702 and 704 may be carried out by a software application installed on the computing device during an unauthenticated state of the software application.

Figure 10:
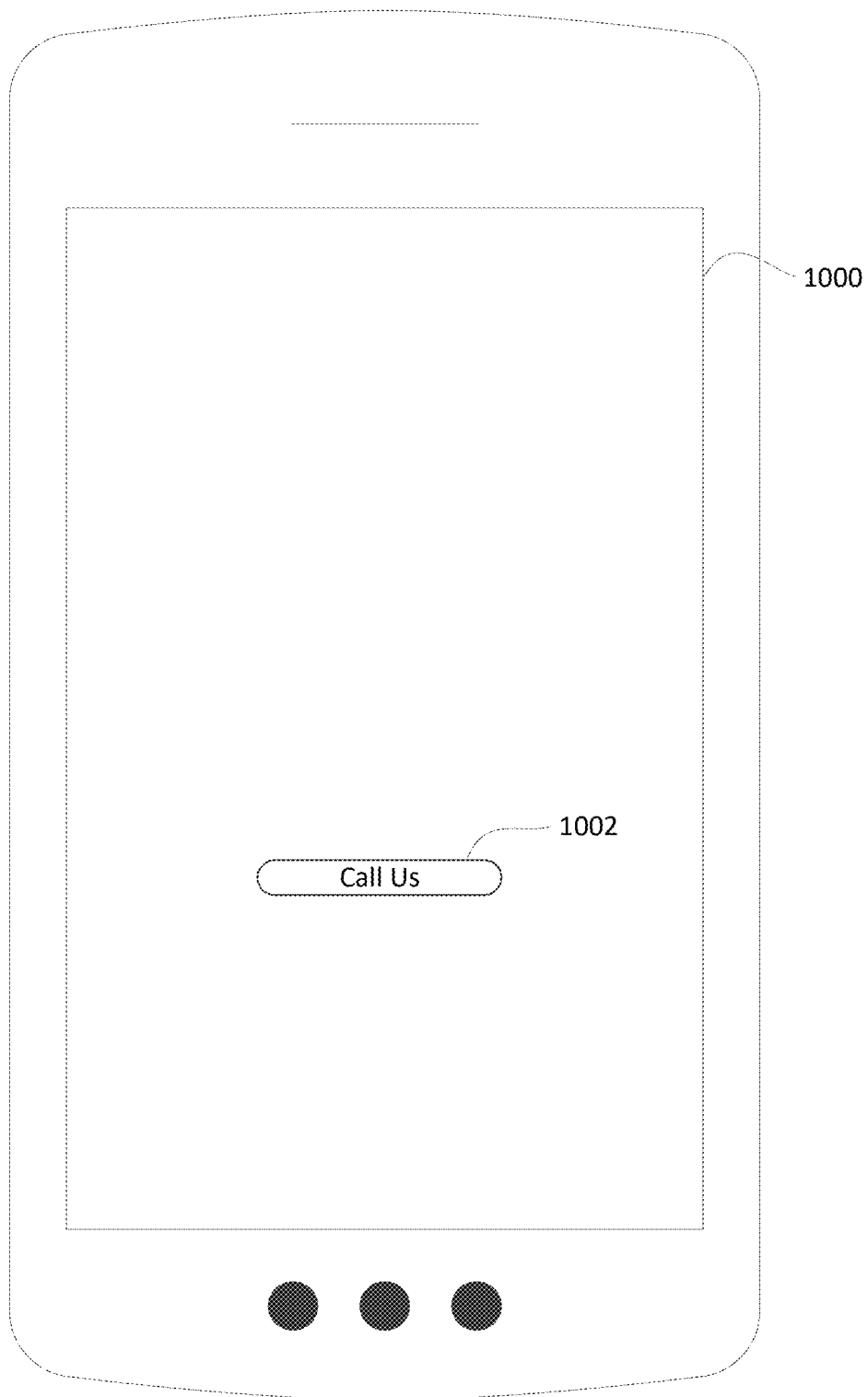
FIG. 10 shows another example graphical input interface for initiating a phone call.

In operation 702, a computing device receives an instruction to initiate an interaction with and/or connect with a computing system. The instruction may correspond to or be based on input received at an input interface. For example, referring briefly to FIG. 10, the instruction may correspond to or be triggered by a user clicking or tapping a call button 1002 displayed in a graphical user interface 1000. Users may be presented with, via the call button 1002, the option to call an entity associated with the input interface. The call button 1002 may be tapped or clicked to indicate selection of the option to call. In some embodiments, the interface may be provided by a first software application, which may correspond to the software application that is provisioned with anonymous information in the example method described in FIG. 6.

In some embodiments, in response to receiving the instruction, the first software application may invoke or launch a second software application, which may correspond to the communications application 514 included in the example computing device 510 in FIG. 5. The first software application may also provide the second software application with communications information, such as a phone number, corresponding to the selectable call option, as well an anonymous information retrieved by the first software application.

Referring back to FIG. 7, in operation 704, in response receiving the instruction, the computing device may establish a connection with the computing system and send the anonymous data to the computing system. In some embodiments, the first or second software application may establish a telephone connection with the computing system based on the communications information. For example, the first or second software application may use a phone number, with the anonymous information appended to the phone number, to initiate a telephone call.

In operation 706, the computing system may receive the anonymous information and use it to identify a profile corresponding to the anonymous information. In some embodiments, the anonymous information may be received by an interactive voice response engine that identifies a particular profile based on the anonymous information. In this way, the computing system may predict that the connection and interaction with the computing device, and voice input received during the call, correspond to the particular profile.

Various techniques and data structures may be implemented to determine, select or identify a profile based on anonymous information. In some embodiments, the anonymous information may be used to lookup a profile or account identifier in a table or directory maintaining a mapping of anonymous information to profiles. The profile or account identifier may correspond to a particular profile.

In operation 708, the computing system receives input from the first and/or second software application. At least a portion of a communication received via the established connection, and during an interaction with the computing device, may be analyzed by an application of an artificial intelligence algorithm to generate an indication of sentiment. For example, at least a portion of audio from a call may be automatically analyzed by an artificial intelligence system to determine a sentiment of the caller.

In operation 710, the computing system may determine an attrition risk level corresponding to the particular profile. The determination of the attrition risk level may be based on various factors. For example, attrition risk level may be based on the determined sentiment and/or historical transaction data. The determined attrition risk level may be compared to a threshold and the profile may be assigned a particular type or category based on the comparison. For example, if the attrition risk level is high, then the particular profile may be flagged as an "at-risk" profile.

Figure 8:
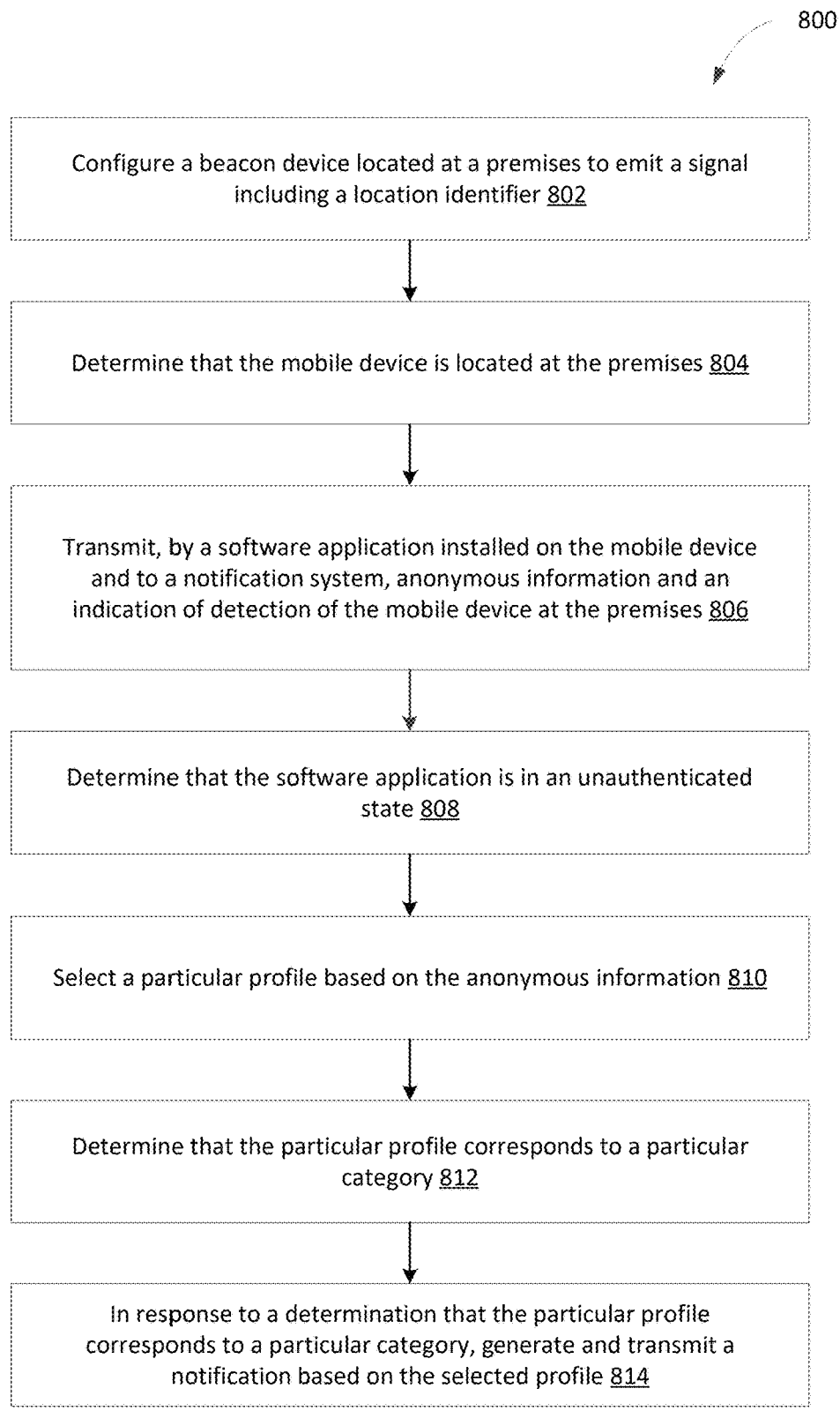
FIG. 8 shows, in flowchart form, an example method of generating and transmitting a notification, according to another example embodiment.

Reference will now be made to FIG. 8 which illustrates an example method 800 for transmitting a notification. The method 800 may be implemented by one or more computer systems suitably programmed to carry out the functions described. The operations of the example method 800 may be performed by one or more computer systems which may be of the type described herein. In some embodiments, one or more of the operations may be carried out by the mobile device 120 and the notification system 140 in the example operating environment 100 described in FIG. 1. In some embodiments, one or more operations may be carried out during an unauthenticated state of a software application installed on the mobile device.

In operation 802, a beacon device emits a signal. The signal may be configured to broadcast a location identifier. The location identifier may identify a premises at which the beacon device is installed.

In operation 804, a determination is made that the mobile device is located at the premises. In some embodiments, the software application installed on the mobile device may determine that the mobile device is located at the premises based on receiving an indication of the beacon signal and the location identifier. The software application may verify that the location identifier included in the beacon signal is the same one that has previously been provisioned to the software application. The software application may be a sensor application and may correspond to the software application that is provisioned with anonymous information and a location identifier in the example method described in FIG. 6.

Alternatively or additionally, other techniques may be used to determine that the mobile device is at the premises. For example, in some implementations, the software application may monitor location data from a location subsystem included in the mobile device and use the location data to detect when the mobile device has entered a geofence associated with the premises.

In operation 806, in response to determining that the mobile device is located at the premises, the software application may transmit to a notification system an indication of detection of the mobile device. In some embodiments, the transmission may include a message having one or more parameters. The parameters may include the location identifier that serves to provide an indication of detection of the mobile device. The parameters may include a state parameter indicating an authentication state of the software application. The state parameter may indicate an "unauthenticated" state where no user is currently authenticated with the software application, for example, by logging in to the software application. If the software application is in an unauthenticated state, then the message may include the anonymous information stored on the mobile device. In some embodiments, where the message is sent by a software application that is not in an authenticated state corresponding to a profile maintained by the notification system, the message may be referred to as be an unauthenticated message.

In operation 808, the notification system may determine that the software application is in an unauthenticated state. In at least one embodiment, the determination may be made based on the state indicator received from the software application. In some embodiments, the determination may be made based on session information maintained by the notification system.

In operation 810, in response to receiving the anonymous information and the indication of detection, a particular profile may be selected from a plurality of profiles based on the anonymous information. In some embodiments, the anonymous information may be used to lookup a profile or account identifier in a table or directory maintaining a mapping of anonymous information to profiles. The profile or account identifier may correspond to a particular profile.

In operation 812, the notification system may determine that the particular profile corresponds to a particular category or is of a particular type. The particular category or type may be, for example, a very important person (VIP) category or type. Such a profile may have a large quantity of resources stored in a resource account corresponding to the profile and/or have an account of a particular category or type (e.g. a particular account class). In some embodiments, the particular category is a customer attrition category. The notification system may determine that the particular profile corresponds to an "at-risk" attrition category if an attrition risk level for the profile has been determined to be high.

In operation 814, in response to receiving the anonymous information and the indication of detection, and further in response to a determination that the particular profile corresponds to a particular category, the notification system may further generate and transmit a notification based on the selected profile.

In some embodiments, the notification may be transmitted in response to a determination that the particular profile meets a certain criteria. The criteria may be that the particular profile correspond to a particular category or be of a particular type. In this way, the category or type of the particular profile may trigger the notification. For example, the particular type of profile that triggers the notification may be or include a "VIP" and/or "at-risk" profile type.

The notification may be transmitted to the mobile device and/or a customer service representative's device located at the premises. In some cases, the notification sent to the mobile device may be different from the notification that is sent to the customer service representative's device.

The content of the notification may be based on the category or type that triggers the notification. The notification may also include stored data included in, or corresponding to, the particular profile.

Where the notification is sent to the mobile device, the notification may include an option to navigate within the premises to a particular location. In some embodiments, the notification may include instructions to facilitate a meeting with a customer support representative. For example, the mobile device may be provided with instructions on where to go within the premises for the meeting. The mobile device may be updated to display the instructions. The navigational experience may use beacons for locating purposes as the mobile device moves within the premises. The navigational experience may also assist visually impaired customers through audible prompts.

In this way, when a customer arrives on site at a branch of a financial institution with their mobile device, the notification system may identify whether a profile probabilistically corresponding to the customer is of a certain type and, if so, it may trigger a notification to ensure that the customer receives special handling. The notification may be provided on the customer's mobile device to, for example, tell the customer that they do not need to wait in line and can go directly to a particular location to speak with someone immediately.

Where the notification is sent to the customer service representative's device, the notification may indicate that the customer is on site. The notification may, for example, include a customer name specified by the particular profile. In some embodiments, the notification may include a summary of an issue related to a category that triggered the notification. The summary may be a summary generated by an artificial intelligence algorithm in response to a negative sentiment detected by the notification system. The summary may be displayed by the customer service representative's device.

In this way, where a customer with an "at-risk" profile enters a premises, the at-risk customer may be automatically detected by the notification system based on various factors. For example, audio from past calls may be automatically analyzed by an artificial intelligence to determine whether a customer is an at-risk customer. For example, the artificial intelligence system may assess whether a customer was angry during a call and anger may be an indicator of being an at-risk customer. In response to detecting the entry of the at-risk customer, a notification may be sent to a customer support representative's device located at the premises. The customer service representative may be able to quickly read the summary to understand that the customer may be upset and the reason for that sentiment. This approach may provide the customer service representative with an opportunity to provide personalized and specialized attention to the customer to regain their loyalty.

In some implementations, the notification that may be generated on a customer support representative's device may be generated on a plurality of, or all, customer representatives' devices located at the premises so that multiple or all customer support representatives may be ready to assist the customer associated with the mobile device. The notification may, in other instances, be generated on only specific customer support representatives' devices. For example, the notification system may be generated on a terminal device of a customer representative at a special location where the customer has been asked to go. That is, the customer may be directed to a particular representative immediately upon entering the premises and that representative may immediately be provided with data about the customer such as a summary of why the customer may be angry.

Figure 11:
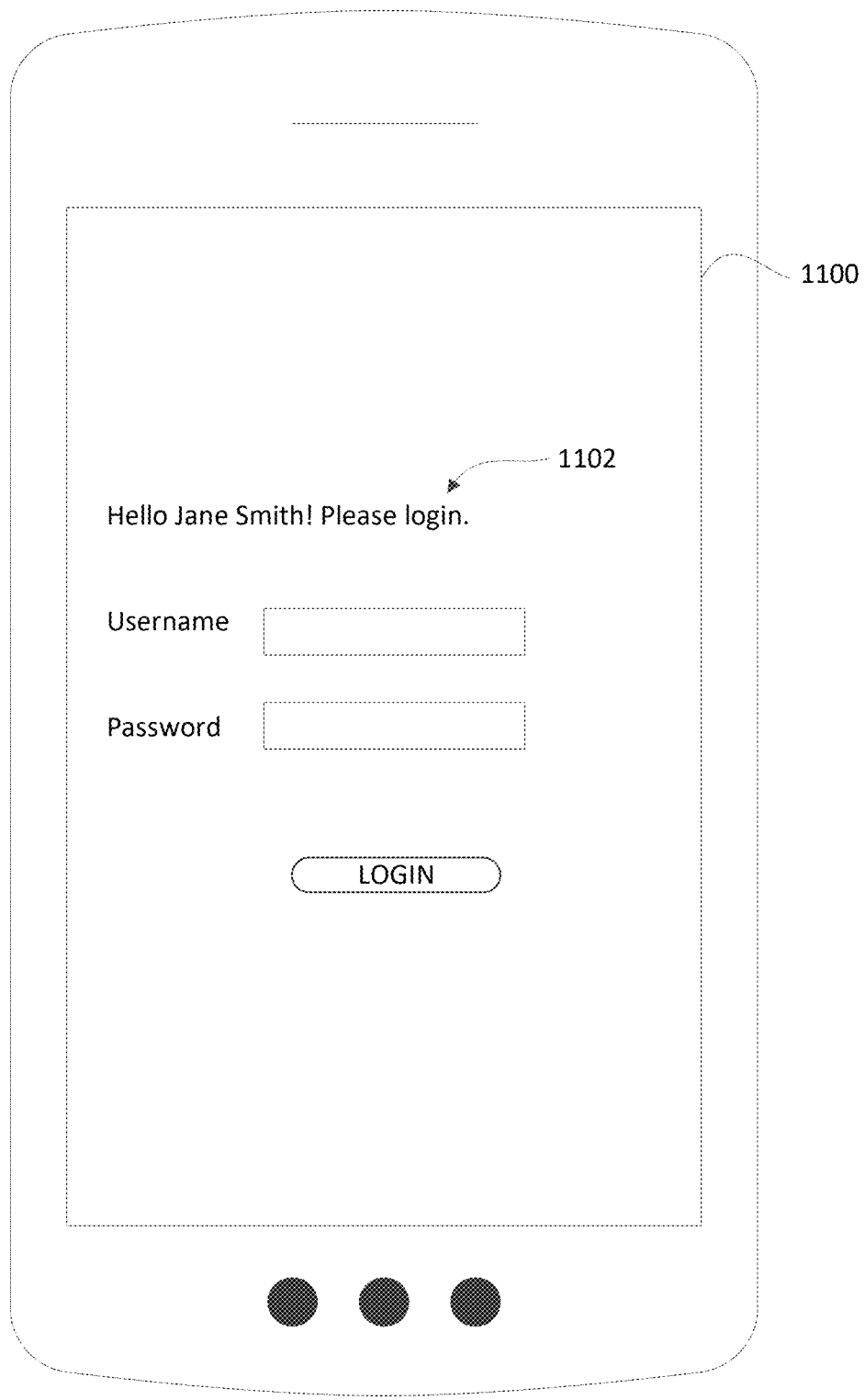
FIG. 11 is an example graphical input interface for authenticating a user of the mobile device.

In some embodiments where the notification is sent to the mobile device, the notification may be transmitted to the software application installed on the mobile device and may include a message prompting for input for transitioning the software application from the unauthenticated state to a second authenticated state. For example, referring briefly to FIG. 11, shown is an authentication interface 1100 for authenticating a user of the mobile device. The authentication interface 1100 may be displayed on the mobile device in response to the notification. The authentication interface 1100 includes the notification message 1102 prompting for login input. The authentication interface 1100 also includes input areas to receive data indicating a username and password. The authentication interface 1100 also includes a button for submitting authentication information, namely the credentials, to the notification system. Upon receipt of the authentication information, the notification system may authenticate the user as corresponding to a profile, which may be the previously selected particular profile. The software application may receive a message confirming authentication of the user and, in response, transition from an unauthenticated state to an authenticated state. During the authenticated state of the software application, the notification system may also transmit to the software application a message that has a higher sensitivity level than the notification. For example, the notification system may include a personalized message "Hello Jane Smith! Please login." during the unauthenticated state of the software application. When the software application is in an authenticated state, then the notification system may generate and transmit to the mobile device a message including confidential or deterministic information contained in the authenticated profile.

Figure 9:
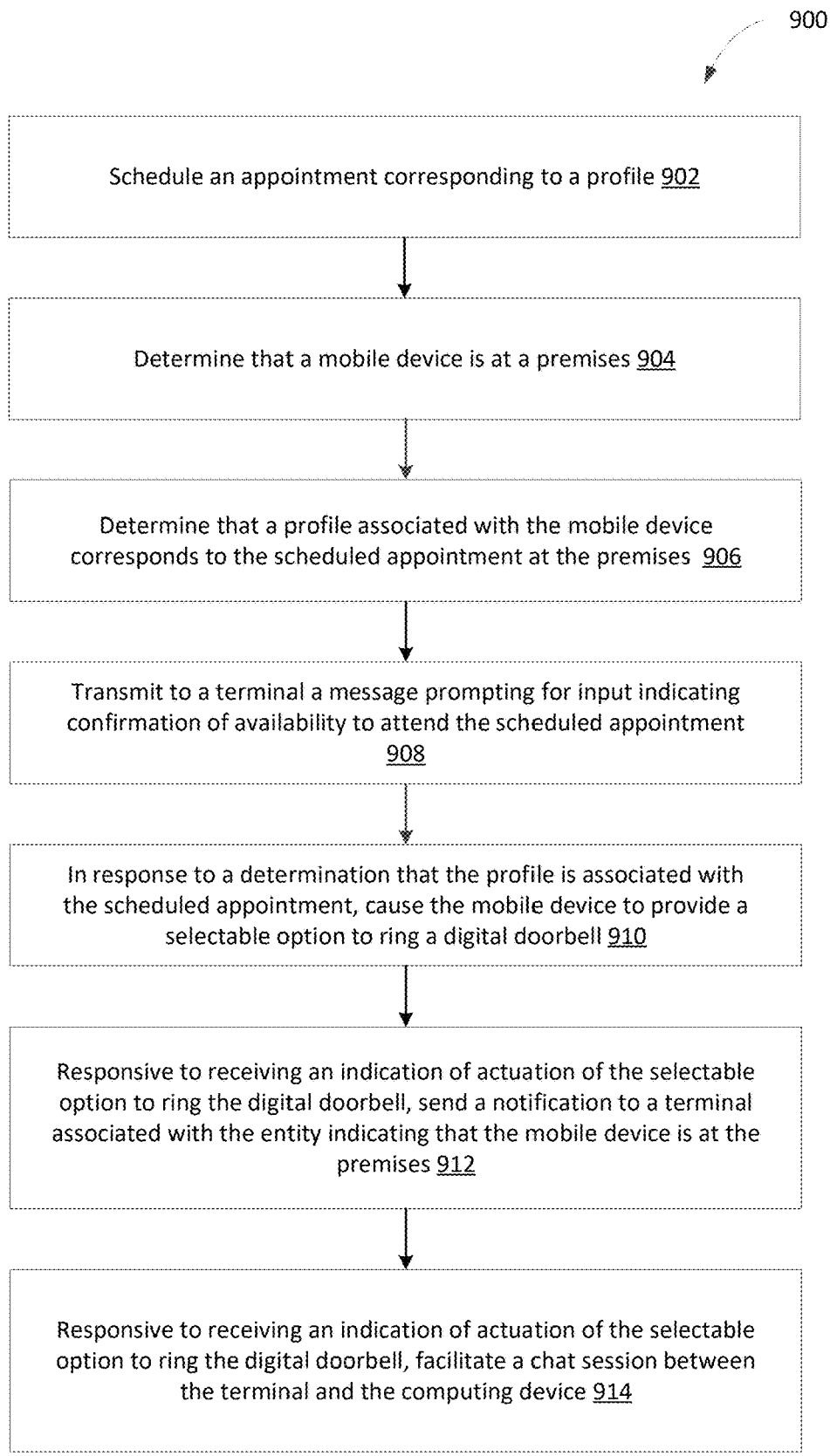
FIG. 9 shows, in flowchart form, an example method of generating and transmitting a notification based on an actuation of a digital doorbell, according to another example embodiment.

Reference will now be made to FIG. 9 which illustrates an example method 900 of generating and transmitting a notification based on an actuation of a digital doorbell. The method 900 may be implemented by one or more computer systems suitably programmed to carry out the functions described. The operations of the example method 900 may be performed by one or more computer systems which may be of the type described herein. In some embodiments, one or more of the operations may be carried out by the mobile device 120 and the notification system 140 in the example operating environment 100 described in FIG. 1.

In operation 902, the notification system schedules an appointment corresponding to a profile. In some embodiments, the notification system receives a message including an instruction to schedule an appointment at a premises with an entity and the instruction triggers the notification system to schedule the appointment. The instruction may be received from a software application during an authenticated state of the software application. The authentication state and the scheduled appointment may correspond to a profile maintained by the notification system. In some embodiments, the appointment is scheduled prior to determining that the mobile device is at a premises.

In operation 904, a determination is made that the mobile device is at the premises. The determination may be made during an unauthenticated state of the mobile device. In some embodiments, the operation 904 may correspond to the operation 804 of the example method of FIG. 8.

In operation 906, a determination is made that a profile associated with the mobile device corresponds to the scheduled appointment at the premises. In some embodiments, the determination involves transmitting, by a software application installed on the mobile device and to the notification system, anonymous information and an indication of detection of the mobile device at the premises. The notification system may further determine that the software application is in an unauthenticated state and may select a particular profile based on the anonymous information. The notification system may further determine that the particular profile corresponds to a particular category. The particular category may be a scheduled appointment category. For example, the notification system may determine that the profile falls with a category of profiles that have scheduled appointments at the premises. In some embodiments, the operation 906 may correspond to one or more operations 806, 808, 810, and/or 812 of the example method 800 of FIG. 8.

In operation 908, in response to a determination that the mobile device is at the premises and in response to determining that the profile associated with the mobile device corresponds to the scheduled appointment at the premises, the notification system may confirm that the entity associated with the scheduled appointment, for example a customer support representative, is immediately available. That is, the notification system may determine from scheduling or calendar data, that the customer support representative appears to be available, and it may then transmit, to a terminal associated with the customer support representative, a message prompting for input indicating confirmation of availability to attend the scheduled appointment. In some embodiments, the message may correspond to a notification generated and transmitted in operation 814 of the example method 800 of FIG. 8.

The notification may receive, from the terminal, an indication of confirmation of availability and, in response, the notification system may instruct and cause the mobile device to provide to an option to ring a digital doorbell to notify the customer support representative that the customer associated with the particular profile is on site at the premises. If the customer support representative is not immediately available, the notification system may instruct and cause the mobile device to present an option to schedule a meeting in the future instead of the option to ring the digital doorbell.

In operation 910, in response to a determination that the profile is associated with the scheduled appointment, and/or in response to the indication of confirmation of availability, and/or in response to a determination that the profile corresponds to a particular category or is of a particular type, the notification system may instruct and cause the mobile device to provide a selectable option to send an indication signal by, for example, sending an instruction to the mobile device to provide the selectable option. The selection option may be a selectable option to actuate or ring a digital doorbell or indicator.

The selectable option may, in some implementations, only be provided by the mobile device if the profile is associated with an appointment scheduled at the premises and at or near the current time. If the profile does not include a scheduled appointment, the notification system may instruct and cause the mobile device to display an option to schedule an appointment. The notification system may be integrated with a calendar or scheduling system that is able to check the availability of customer support representatives located at the premises in real-time. If a customer support representative is immediately available, the mobile device may display a digital doorbell interface. That is, the mobile device may provide an option to notify the customer service representative that the customer associated with the particular profile is on site at the premises.

In some embodiments, the software application installed on the mobile device should be in an authenticated state before or after activating the digital doorbell. For example, in some implementations, the option to provide the digital doorbell may only be provided after successful authentication with the particular profile. In some implementations, the option to provide the digital doorbell may be provided while the software application providing the digital doorbell interface is in an unauthenticated state.

Figure 12:
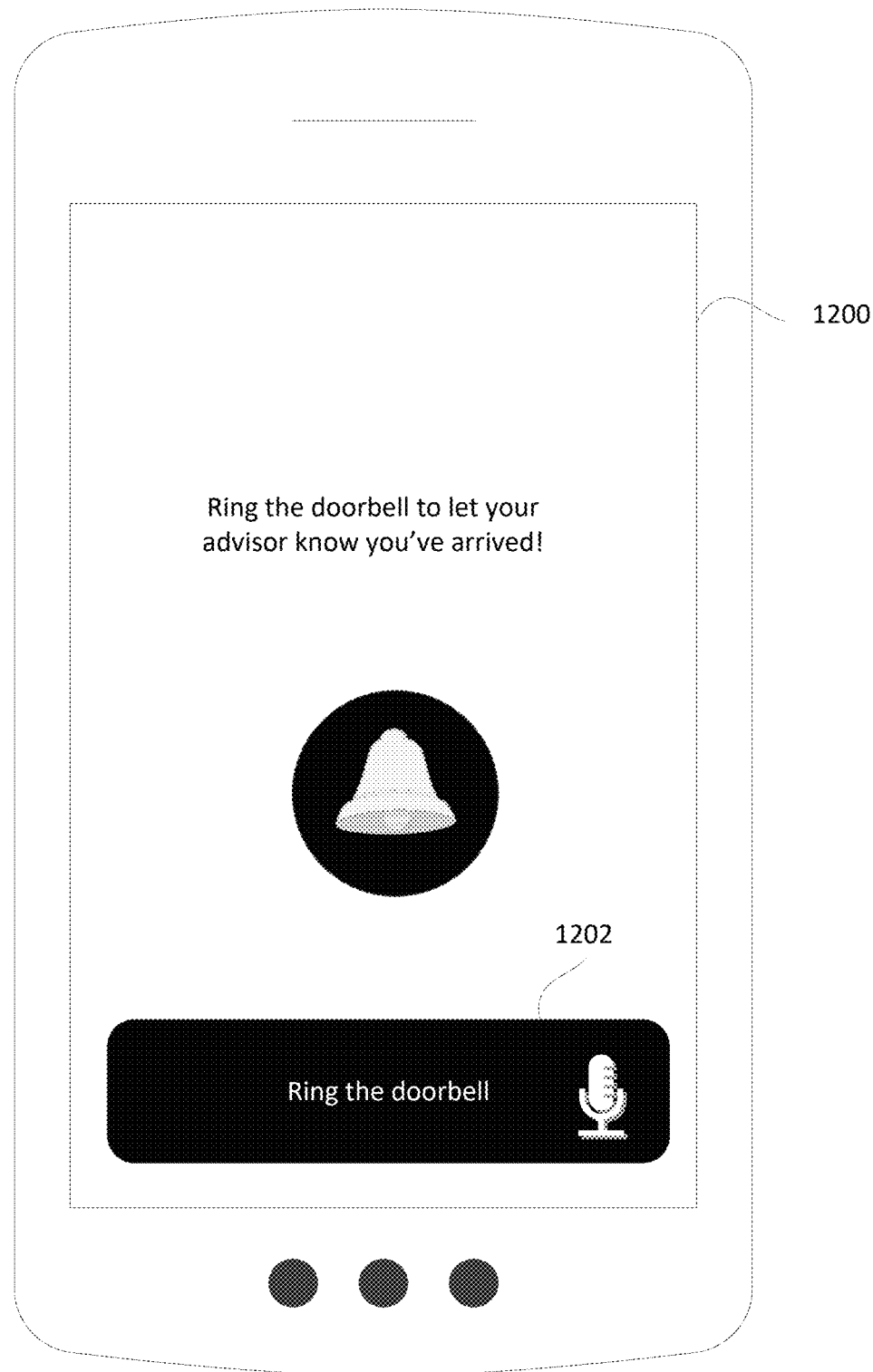
FIG. 12 is an example digital doorbell interface.
Figure 13:
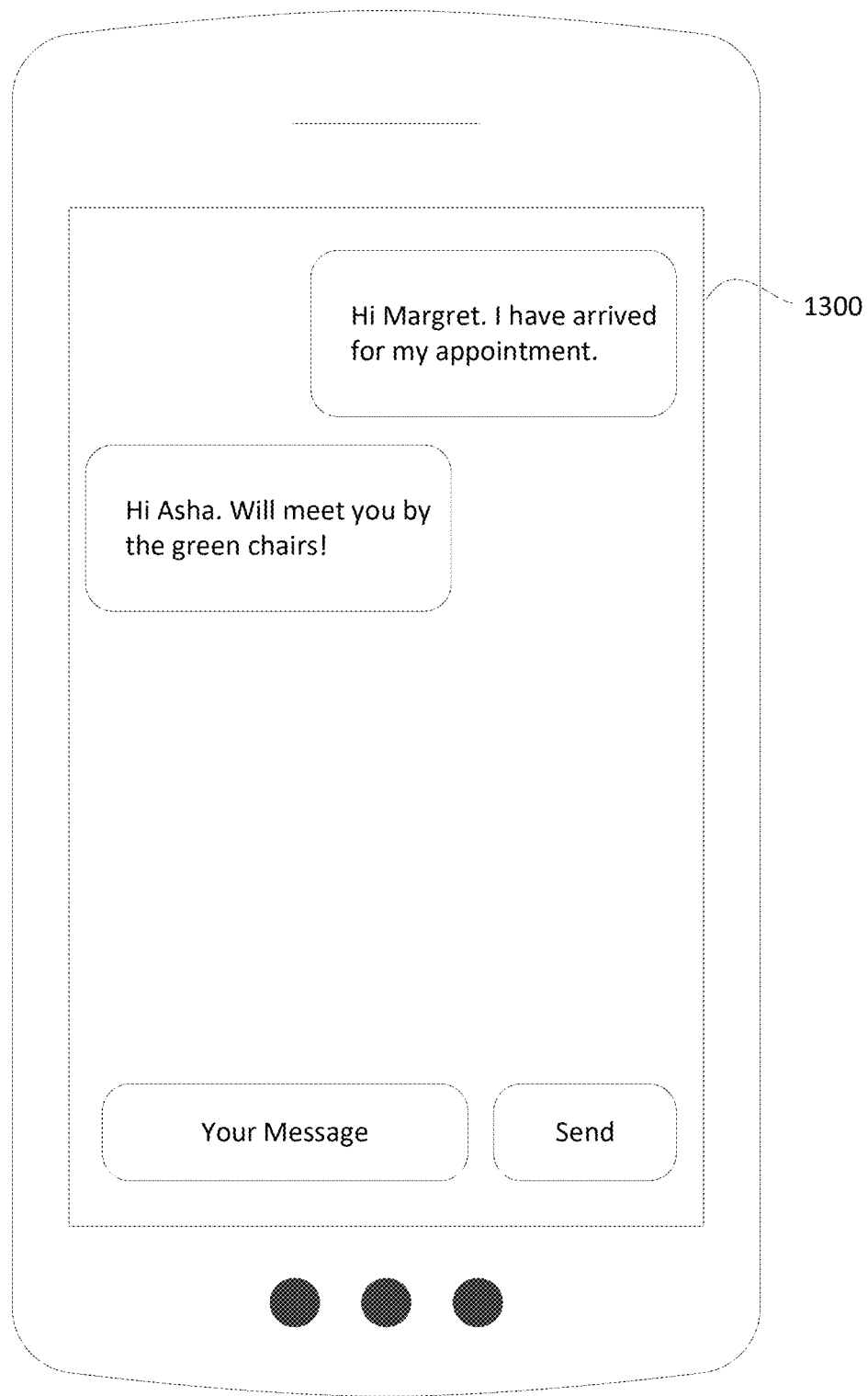
FIG. 13 is an example chat interface.

Referring briefly to FIG. 12, shown is an example digital doorbell interface 1200. The digital doorbell interface 1200 may be displayed on the mobile device in response to the instruction from the notification system. The digital doorbell interface 1200 may include a selectable option 1202 to ring a digital doorbell. The selectable option 1202 may be in the form of a button or any other suitable user interface element. Actuation of the selectable option 1202 by input received by the mobile device may trigger the mobile device to send to the notification system an indication signal indicating actuation of the selectable option.

Referring back to FIG. 9, in operation 912, in response to receiving the indication of actuation of the selectable option, the notification system may take an action. In some embodiments, the action may include sending a notification to a terminal associated with the entity that the appointment is scheduled with. The notification to the terminal may indicate that the mobile device is at the premises.

In some embodiments, the action may include facilitating a chat session between the terminal and the mobile device. Referring briefly to FIG. 12, shown is an example chat interface 1200. The chat interface 1200 may allow text messages to be exchanged in real-time between the mobile device and the terminal via the notification system.

Referring back to FIG. 9, other possible actions may exist. The action taken may include one or more operations performed in operation 814 of the method 800 of FIG. 800. For example, the notification system may send an instruction to the mobile device to provide an option to navigate to a meeting point corresponding to the scheduled appointment and/or may provide navigational information to the computing device to facilitate location of a meeting point.

In some embodiments, where the software application is an authenticated state corresponding to the particular profile, the action may include sending to the mobile device a message including a temporary identifier for display by the mobile device. The user of the mobile device may show the temporary identifier to a customer support representative to authenticate the identity of the customer. The code may be used to prove to the customer support representative that the customer is associated with the particular profile.

The example methods 600, 700, 800 and 900 of FIGS. 6-9 provide an approach for pushing out anonymous information to mobile devices and using that anonymous information to generate and trigger location-based notifications. This may be particularly helpful in scenarios where a customer entering premises may not be authenticated with a relevant software application and may be annoyed by a request to authenticate. This may also facilitate implementations that are more lightweight than techniques that require authentication.

It will be appreciated that the techniques described herein may be used in numerous scenarios. For example, one or more techniques described in the methods 600, 700, 800 and 900 of FIGS. 6-9 may be integrated with each other. By way of another example, some of the embodiments described herein focus on financial environments and systems. However, it is understood that the present application is not limited to any such embodiments and that the embodiments described generally may be extended to other types of environments and systems.

It will be appreciated that it may be that some or all of the above-described operations of the various above-described example methods may be performed in orders other than those illustrated and/or may be performed concurrently without varying the overall operation of those methods.

It will also be appreciated that some or all of the above-described operations of the various above-described example methods may be triggered by, or caused by, or performed in response to, one or more of the above-described operations, and may be performed in real-time or near real-time in response to one or more of the above-described operations and/or automatically without user input.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:
1. A computer system comprising:
a communications module;
one or more processors coupled to the communications module; and
a memory coupled to the one or more processors and storing instructions that, when executed by the computer system, cause the computer system to:
generate anonymous information and associate the anonymous information with a particular profile in a plurality of profiles;

during an authenticated state of a software application installed on a computing device, provision the software application with the anonymous information; and during an unauthenticated state of the software application:

receive, from the software application, the anonymous information and an indication of detection of the computing device at a premises; and in response to receiving the anonymous information and the indication of detection:

select the particular profile based on the anonymous information; and transmit a notification based on the particular profile.

2. The computer system of claim 1, wherein the instructions further cause the computer system to, during the unauthenticated state of the software application, receive, from the software application, a location identifier corresponding to the premises, wherein the selection of the particular profile is further based on the location identifier.

3. The computer system of claim 2, wherein the location identifier includes a transit number representing a branch of a financial institution.

4. The computer system of claim 2, further comprising a beacon located at the premises and configured to emit a signal, including the location identifier, for reception by the computing device and to trigger the software application to automatically send the indication and the anonymous information to the computer system.

5. The computer system of claim 1, wherein the instructions further cause the computer system to generate the notification based on stored data corresponding to the particular profile.

6. The computer system of claim 1, wherein the notification is transmitted to the software application and the notification prompts for input for transitioning the software application from the unauthenticated state to a second authenticated state.

7. The computer system of claim 6, wherein the instructions further cause the computer system to, during the second authenticated state of the software application, transmit to the software application a message that has a higher sensitivity level than the notification.

8. The computer system of claim 1, wherein the notification includes an option to navigate within the premises to a particular location.

9. The computer system of claim 1, wherein the instructions further cause the computer system to trigger the transmission of the notification in response to a determination that the particular profile corresponds to a particular category.

10. The computer system of claim 9, wherein the particular category is a customer attrition category and the notification is transmitted to a customer service representative device located at the premises.

11. The computer system of claim 9, wherein the instructions further cause the computer system to categorize the particular profile as being associated with the particular category by an application of a generative artificial intelligence algorithm to at least a portion of a communication to generate an indication of sentiment.

12. A computer-implemented method comprising:

generating anonymous information and associating the anonymous information with a particular profile in a plurality of profiles;

during an authenticated state of a software application installed on a computing device, provisioning the software application with the anonymous information; and during an unauthenticated state of the software application:

receiving, from the software application, the anonymous information and an indication of detection of the computing device at a premises; and in response to receiving the anonymous information and the indication of detection:

selecting the particular profile based on the anonymous information; and transmitting a notification based on the particular profile.

13. The method of claim 12, further comprising, during the unauthenticated state of the software application, receiving, from the software application, a location identifier corresponding to the premises, wherein selecting the particular profile is further based on the location identifier.

14. The method of claim 13, wherein the location identifier includes a transit number representing a branch of a financial institution.

15. The method of claim 13, further locating a beacon at the premises and configuring the beacon to emit a signal, including the location identifier, for reception by the computing device and triggering the software application to automatically transmit the indication and the anonymous information.

16. The method of claim 12, further comprising generating the notification using artificial intelligence based on stored data corresponding to the particular profile.

17. The method of claim 12, wherein the notification is transmitted to the software application and the notification prompts for input for transitioning the software application from the unauthenticated state to a second authenticated state.

18. The method of claim 17, further comprising, during the second authenticated state of the software application, transmitting to the software application a message that has a higher sensitivity level than the notification.

19. The method of claim 12, wherein the notification includes an option to navigate within the premises to a particular location.

20. A non-transitory computer-readable storage medium comprising processor-executable instructions which, when executed, configure one or more processors to:

generate anonymous information and associate the anonymous information with a particular profile in a plurality of profiles;

during an authenticated state of a software application installed on a computing device, provision the software application with the anonymous information; and during an unauthenticated state of the software application:

receive, from the software application, the anonymous information and an indication of detection of the computing device at a premises; and in response to receiving the anonymous information and the indication of detection:

select the particular profile based on the anonymous information; and transmit a notification based on the particular profile.

* * * * *